United States Patent
Takahashi et al.

(10) Patent No.: US 12,255,746 B2
(45) Date of Patent: Mar. 18, 2025

(54) TERMINAL AND RADIO COMMUNICATION METHOD

(71) Applicant: NTT DOCOMO, INC., Tokyo (JP)

(72) Inventors: Yuki Takahashi, Tokyo (JP); Satoshi Nagata, Tokyo (JP); Xiaohong Zhang, Beijing (CN); Shaozhen Guo, Beijing (CN); Lihui Wang, Beijing (CN); Xiaolin Hou, Beijing (CN)

(73) Assignee: NTT DOCOMO, INC., Tokyo (JP)

( * ) Notice: Subject to any disclaimer, the term of this patent is extended or adjusted under 35 U.S.C. 154(b) by 398 days.

(21) Appl. No.: 17/760,639

(22) PCT Filed: Sep. 17, 2019

(86) PCT No.: PCT/JP2019/036424
§ 371 (c)(1),
(2) Date: Mar. 15, 2022

(87) PCT Pub. No.: WO2021/053734
PCT Pub. Date: Mar. 25, 2021

(65) Prior Publication Data
US 2022/0337357 A1 Oct. 20, 2022

(51) Int. Cl.
*H04L 1/1812* (2023.01)
*H04L 1/1867* (2023.01)
*H04W 72/23* (2023.01)

(52) U.S. Cl.
CPC .......... *H04L 1/1887* (2013.01); *H04L 1/1812* (2013.01); *H04W 72/23* (2023.01)

(58) Field of Classification Search
CPC ..... H04L 1/1812; H04L 1/1887; H04W 72/23
See application file for complete search history.

(56) References Cited

U.S. PATENT DOCUMENTS

2022/0149997 A1* 5/2022 Wang ..................... H04L 1/1864
2022/0159692 A1* 5/2022 Lee ......................... H04L 5/0053

OTHER PUBLICATIONS

Machine translation of p. 21 of the Apr. 30, 2019 Foreign Application Priority document CN 201910363684.4. (Year: 2019).*
International Search Report issued in PCT/JP2019/036424 on Apr. 14, 2020 (1 page).
Written Opinion of the International Searching Authority issued in PCT/JP2019/036424 on Apr. 14, 2020 (4 pages).
(Continued)

*Primary Examiner* — James P Duffy
(74) *Attorney, Agent, or Firm* — Osha Bergman Watanabe & Burton LLP

(57) ABSTRACT

A terminal according to an aspect of the present disclosure includes: a receiving section that receives downlink control information for releasing a plurality of semi-persistent schedulings (SPSs); and a control section that performs control of including a valid Hybrid Automatic Repeat reQuest ACKnowledgement (HARQ-ACK) corresponding to the downlink control information at at least one of a plurality of positions of HARQ-ACKs corresponding to downlink shared channel (Physical Downlink Shared Channel (PDSCH)) reception of the plurality of SPSs in a semi-static HARQ-ACK codebook. According to an aspect of the present disclosure, the HARQ-ACK codebook can be appropriately determined even when joint SPS release is used.

5 Claims, 10 Drawing Sheets

(56) References Cited

OTHER PUBLICATIONS

LG Electronics; "Discussion on DL SPS enhancement and resource conflict between PUSCHs"; 3GPP TSG RAN WG1 #98, R1-1908547; Prague, Czech Republic; Aug. 26-30, 2019 (7 pages).
3GPP TS 36.300 V8.12.0; "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 8)"; Mar. 2010 (149 pages).

\* cited by examiner

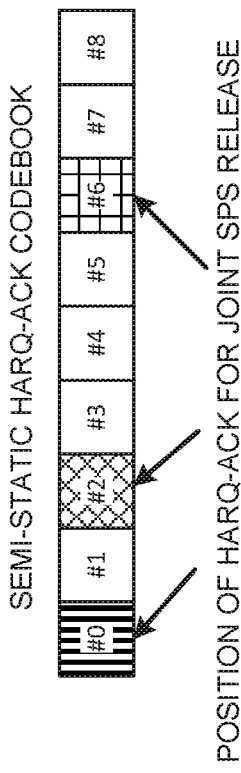
FIG. 4A
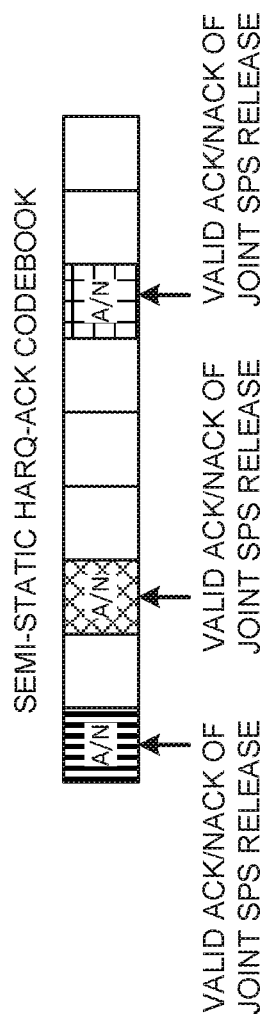
FIG. 4B
FIG. 4C

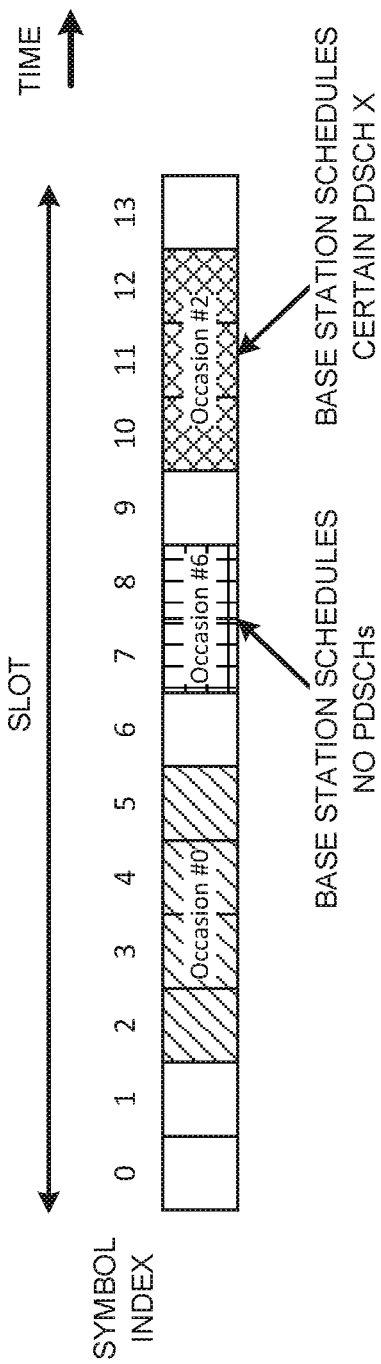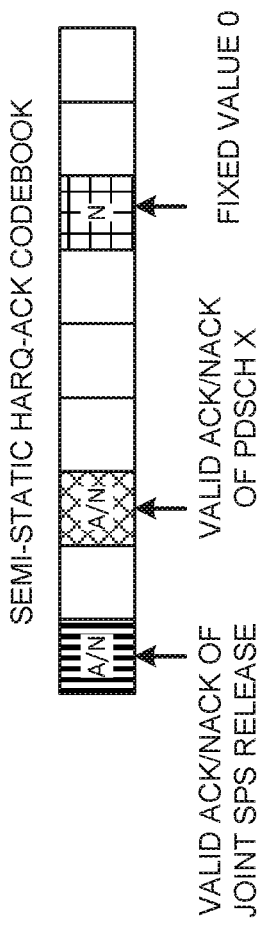
FIG. 5A
FIG. 5B

TERMINAL AND RADIO COMMUNICATION METHOD

TECHNICAL FIELD

The present disclosure relates to a terminal and a radio communication method in next-generation mobile communication systems.

BACKGROUND ART

In Universal Mobile Telecommunications System (UMTS) network, the specifications of Long-Term Evolution (LTE) have been drafted for the purpose of further increasing high speed data rates, providing lower latency and so on (see Non-Patent Literature 1). In addition, for the purpose of further high capacity, advancement and the like of the LTE (Third Generation Partnership Project (3GPP) Release (Rel.) 8 and Rel. 9), the specifications of LTE-Advanced (3GPP Rel. 10 to Rel. 14) have been drafted.

Successor systems of LTE (e.g., referred to as "5th generation mobile communication system (5G))," "5G+ (plus)," "New Radio (NR)," "3GPP Rel. 15 (or later versions)," and so on) are also under study.

CITATION LIST

Non-Patent Literature

Non-Patent Literature 1: 3GPP TS 36.300 V8.12.0 "Evolved Universal Terrestrial Radio Access (E-UTRA) and Evolved Universal Terrestrial Radio Access Network (E-UTRAN); Overall description; Stage 2 (Release 8)," April, 2010

SUMMARY OF INVENTION

Technical Problem

In future radio communication systems (for example, NR), transmission and reception based on semi-persistent scheduling (SPS) is used.

The specification of existing Rel. 15 NR defines that SPS is not configured for more than one serving cell simultaneously for each single cell group (that is, there is one configuration of SPS for each single cell group).

Incidentally, in NR of Rel-16 or later versions, for the sake of more flexible control, configuration of a plurality of SPSs (multiple SPSs) in one cell group has been under study. Further, in NR of Rel. 16 or later versions, deactivation of a plurality of SPSs by using one SPS release has been under study. The SPS release as described above may be referred to as SPS release for a plurality of SPSs, joint SPS release, or the like.

However, how the HARQ-ACK for joint SPS release is configured and how the HARQ-ACK is reported have not yet been studied. Unless these are clearly defined, appropriate HARQ control cannot be performed when a plurality of SPSs are used, which may result in deterioration of communication throughput or the like.

In the light this, the present disclosure has one object to provide a terminal and a radio communication method that enable appropriate determination of a HARQ-ACK codebook even when joint SPS release is used.

Solution to Problem

A terminal according to an aspect of the present disclosure includes: a receiving section that receives downlink control information for releasing a plurality of semi-persistent schedulings (SPSs); and a control section that performs control of including a valid Hybrid Automatic Repeat reQuest ACKnowledgement (HARQ-ACK) corresponding to the downlink control information at at least one of a plurality of positions of HARQ-ACKs corresponding to downlink shared channel (Physical Downlink Shared Channel (PDSCH)) reception of the plurality of SPSs in a semi-static HARQ-ACK codebook.

Advantageous Effects of Invention

According to an aspect of the present disclosure, the HARQ-ACK codebook can be appropriately determined even when joint SPS release is used.

BRIEF DESCRIPTION OF DRAWINGS

FIGS. 4A to 4C are each a diagram to show an example of Embodiments 2-1 and 2-2;

FIGS. 5A and 5B are each a diagram to show an example of Embodiment 2-3;

DESCRIPTION OF EMBODIMENTS

SPS

Figure 1:
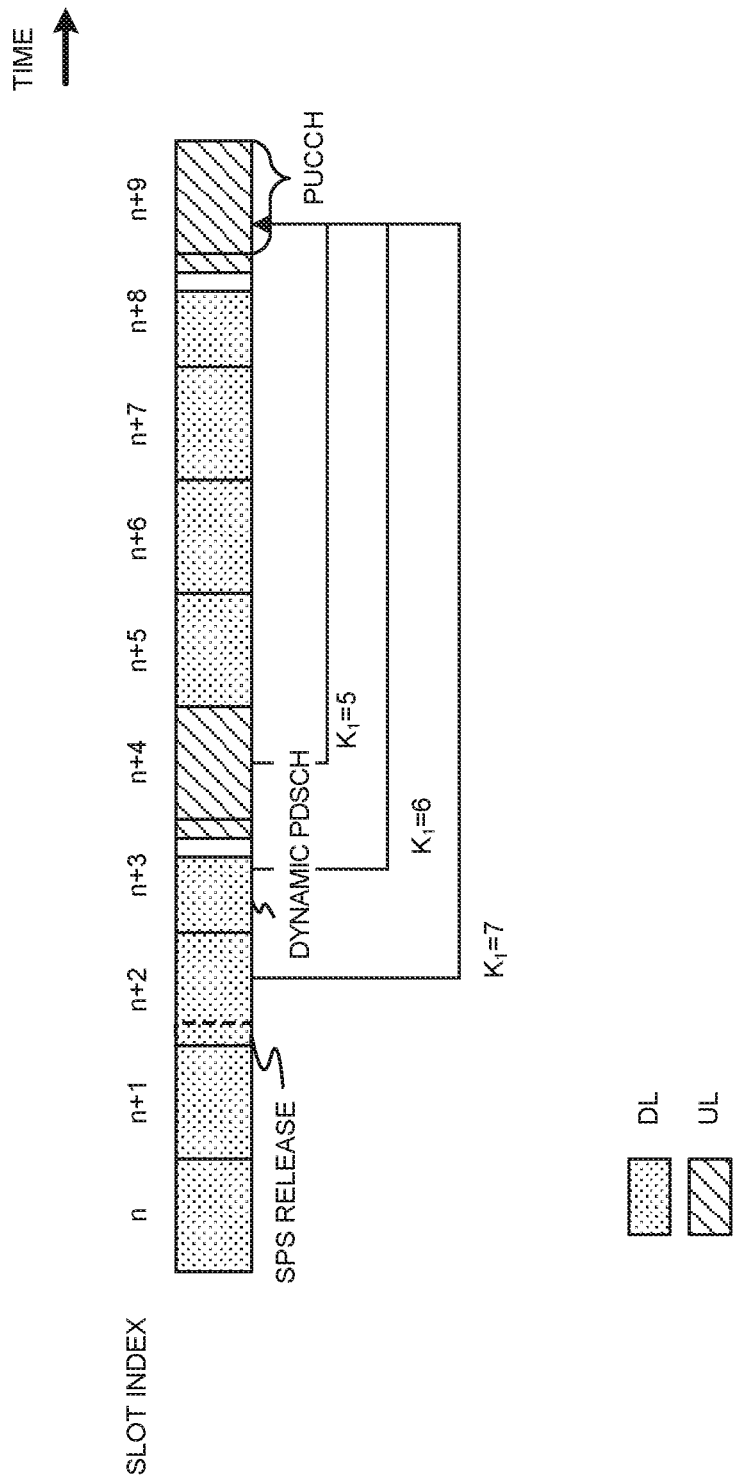
FIG. 1 is a diagram to show an example of a HARQ-ACK window corresponding to a semi-static HARQ-ACK codebook.

In NR, transmission and reception based on semi-persistent scheduling (SPS) is used. In the present disclosure, SPS may be interchangeably interpreted as downlink SPS (DL SPS).

The UE may activate or deactivate (release) SPS configuration, based on a downlink control channel (Physical Downlink Control Channel (PDCCH)). The UE may perform reception of a downlink shared channel (Physical Downlink Shared Channel (PDSCH)) of corresponding SPS, based on the activated SPS configuration.

Note that, in the present disclosure, the PDCCH may be interpreted as downlink control information (DCI) transmitted using the PDCCH, simply DCI, or the like. Further, in the present disclosure, SPS, SPS configuration, SPS reception, SPS PDSCH reception, SPS scheduling, and the like may be interchangeably interpreted as each other.

The DCI for activating or deactivating the SPS configuration may be referred to as SPS activation DCI, SPS deactivation DCI, or the like. The SPS deactivation DCI may be referred to as SPS release DCI, simply SPS release, or the like.

The DCI may include cyclic redundancy check (CRC) bits scrambled with a certain RNTI (for example, a configured scheduling radio network temporary identifier (CS-RNTI)).

The DCI may be a DCI format for PUSCH scheduling (DCI format 0_0, 0_1, or the like), a DCI format for PDSCH scheduling (DCI format 1_0, 1_1, or the like), or the like, and may indicate the SPS activation DCI or the SPS release DCI when one or a plurality of fields indicates a certain bit string.

The SPS configuration (which may be referred to as configuration information related to SPS) may be configured for the UE by using higher layer signaling.

In the present disclosure, the higher layer signaling may be, for example, any one of Radio Resource Control (RRC) signaling, Medium Access Control (MAC) signaling, broadcast information, and the like, or a combination of these.

The MAC signaling may use, for example, a MAC control element (MAC CE), a MAC Protocol Data Unit (PDU), or the like. The broadcast information may be, for example, a master information block (MIB), a system information block (SIB), minimum system information (Remaining Minimum System Information (RMSI)), other system information (OSI), or the like.

The configuration information related to SPS (for example, an "SPS-Config" information element of RRC) may include an index for identifying SPS (SPS index), information related to resources of SPS (for example, a period of SPS), information related to PUCCH resources for SPS, and the like.

The UE may determine the length or the start symbol of SPS and the like, based on a time domain allocation field of the SPS activation DCI.

SPS may be configured for a special cell (SpCell) (for example, a primary cell (PCell) or a primary secondary cell (PSCell)), or may be configured for a secondary cell (SCell).

Note that the specification of existing Rel. 15 NR defines that SPS is not configured for more than one serving cell simultaneously for each single cell group (that is, there is one configuration of SPS for each single cell group). Only one SPS configuration may be permitted (configured) for each Bandwidth Part (BWP) of a serving cell.

HARQ-ACK Codebook

The UE may transmit a HARQ-ACK feedback by using one PUCCH resource in the unit of a HARQ-ACK codebook including bits of one or more pieces of transmission confirmation information (for example, Hybrid Automatic Repeat reQuest ACKnowledgement (HARQ-ACK)). The HARQ-ACK bit may be referred to as HARQ-ACK information, a HARQ-ACK information bit, or the like.

Here, the HARQ-ACK codebook may include bits for the HARQ-ACK in the unit of at least one of a time domain (for example, a slot), a frequency domain (for example, a component carrier (CC)), a spatial domain (for example, a layer), a transport block (TB), and a code block group (CBG) constituting the TB. The HARQ-ACK codebook may be simply referred to as a codebook.

Note that the number of bits (size) included in the HARQ-ACK or the like may be determined semi-statically or dynamically. The HARQ-ACK codebook whose size is semi-statically determined is also referred to as a semi-static HARQ-ACK codebook, a type 1 HARQ-ACK codebook, or the like. The HARQ-ACK codebook whose size is dynamically determined is also referred to as a dynamic HARQ-ACK codebook, a type 2 HARQ-ACK codebook, or the like.

Which of the type 1 HARQ-ACK codebook or the type 2 HARQ-ACK codebook is used may be configured for the UE by using a higher layer parameter (for example, pdsch-HARQ-ACK-Codebook).

In a case of the type 1 HARQ-ACK codebook, the UE may feed back HARQ-ACK bits for PDSCH candidates (or PDSCH occasions) corresponding to a certain range (for example, a range configured based on a higher layer parameter) regardless of whether or not there is scheduling of the PDSCH in the certain range.

The certain range may be determined based on at least one of a certain period (for example, a set of a certain number of occasions for PDSCH reception as candidates, or a certain number of monitoring occasions of the PDCCH), the number of CCs configured or activated by the UE, the number of TBs (the number of layers or a rank), the number of CBGs for each TB, and whether or not spatial bundling is applied. The certain range is also referred to as a HARQ-ACK window, a HARQ-ACK bundling window, a HARQ-ACK feedback window, or the like.

In the type 1 HARQ-ACK codebook, on the condition of falling within the certain range, the UE secures the HARQ-ACK bits for the PDSCH in the codebook even if there is no scheduling of the PDSCH for the UE. When the UE determines that the PDSCH is not actually scheduled, the UE can feed back the bits as NACK bits.

In contrast, in a case of the type 2 HARQ-ACK codebook, the UE may feed back the HARQ-ACK bits for the scheduled PDSCH in the certain range.

Specifically, the UE may determine the number of bits of the type 2 HARQ-ACK codebook, based on a certain field (for example, a DL allocation index (Downlink Assignment Indicator (Index) (DAI)) field) in DCI. The DAI field may include a counter DAI (C-DAI) and a total DAI (T-DAI).

The C-DAI may indicate a counter value of downlink transmission (PDSCH, data, TB) scheduled within a certain period. For example, the C-DAI in the DCI for scheduling the data within the certain period may indicate the number that is counted first in the frequency domain (for example, the CC) and subsequently in the time domain within the certain period. For example, the C-DAI may correspond to a value obtained by counting PDSCH reception or SPS release in ascending order of serving cell indexes and then in ascending order of PDCCH monitoring occasions regarding one or more pieces of DCI included in the certain period.

The T-DAI may indicate a total value (total number) of pieces of data scheduled within the certain period. For example, the T-DAI in the DCI for scheduling the data in a certain time unit (for example, the PDCCH monitoring occasion) within the certain period may indicate the total number of pieces of data scheduled before the time unit (also referred to as a point, timing, or the like) within the certain period.

In existing Rel. 15 NR, the order of HARQ-ACK bits in the codebook is determined as follows. Regarding the type 1 HARQ-ACK codebook, the UE arranges the HARQ-ACK bits corresponding to the SPS PDSCH and SPS release in the HARQ-ACK codebook as with the HARQ-ACK bits corresponding to the dynamic PDSCH (for example, according to a list (table) related to time domain resource allocation). There is no difference in coping with the SPS PDSCH corresponding to the PDSCH reception occasion within the certain period, the SPS release, and the dynamic PDSCH.

Note that, regarding the type 1 HARQ-ACK codebook of Rel. 15 NR, the positions of the HARQ-ACK bits for SPS release are the same as (are determined similarly to) the positions of the HARQ-ACK bits for SPS PDSCH reception corresponding to the SPS release.

Further, in existing Rel. 15 NR, regarding the type 2 HARQ-ACK codebook, the UE may arrange the HARQ-ACK bits corresponding to the SPS PDSCH after the HARQ-ACK codebook corresponding to a dynamic TB-based PDSCH.

In addition, in existing Rel. 15 NR, the UE does not expect to transmit the HARQ-ACK information for more than one SPS PDSCH reception in the same PUCCH.

Figures 2A, 2B:
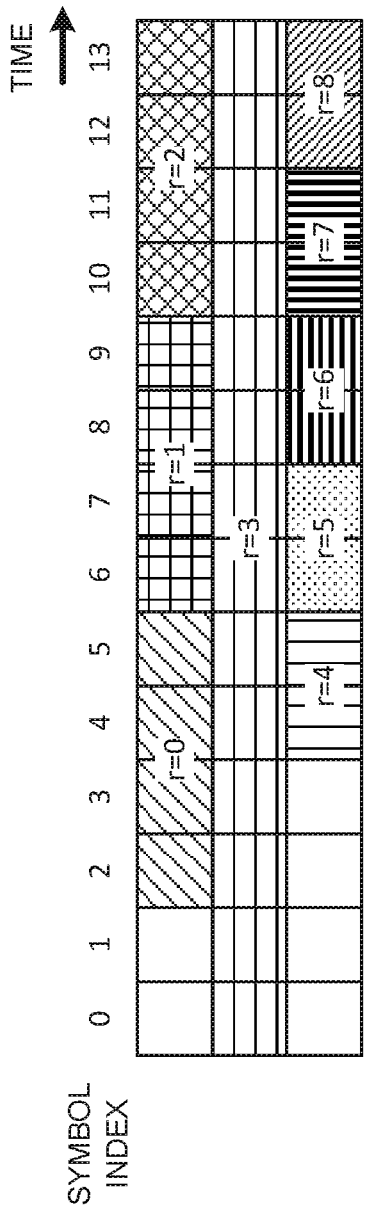
FIGS. 2A and 2B are each a diagram to show an example of candidate PDSCH reception occasions.

With reference to FIG. 1 and FIGS. 2A and 2B, an example of generation of the semi-static HARQ-ACK codebook of Rel. 15 NR will be described.

FIG. 1 is a diagram to show an example of the HARQ-ACK window corresponding to the semi-static HARQ-ACK codebook. The UE determines the HARQ-ACK to be transmitted using a certain PUCCH, based on a value of HARQ-ACK timing.

Transmission timing of the HARQ-ACK for the dynamic PDSCH (which may be referred to as PDSCH-to-HARQ feedback timing, $K_1$, or the like) may be indicated by a PDSCH-to-HARQ feedback timing indicator field included in the DCI (for example, DCI format 1_0/1_1) for scheduling the dynamic PDSCH. When the last slot in which the PDSCH is received is represented by n, the UE transmits the HARQ-ACK corresponding to the PDSCH in $n+K_1$ slot.

The transmission timing $K_1$ of the HARQ-ACK for the SPS PDSCH may be indicated by the PDSCH-to-HARQ feedback timing indicator field included in the DCI used to activate the SPS PDSCH.

The transmission timing $K_1$ of the HARQ-ACK for SPS release may be indicated by the PDSCH-to-HARQ feedback timing indicator field included in the DCI of the SPS release.

In FIG. 1, the UE determines the size of a window (which may be referred to as a HARQ-ACK window) of the semi-static HARQ-ACK codebook to be transmitted on the PUCCH of slot n+9 is a total of 3 slots from slot n+2 to slot n+4 corresponding to a set $K_1=\{7, 6, 5\}$.

Note that, in the example of FIG. 1, the UE is configured that slot n+2 is a full DL slot, slot n+3 is a slot that switches from a DL symbol to an UL symbol (UL symbol is the last two symbols), and slot n+4 and slot n+9 are full UL slots. Further, the UE receives SPS release in slot n+2. The UE may receive the dynamic PDSCH in slot n+3 or the like.

Next, the UE determines candidate PDSCH reception occasions (also referred to as candidate PDSCH occasions, or simply occasions) in each slot corresponding to the HARQ-ACK window. Note that the candidate PDSCH occasions overlapping with the UL symbol are excluded from the target of the semi-static HARQ-ACK codebook.

FIGS. 2A and 2B are each a diagram to show an example of the candidate PDSCH reception occasions. FIG. 2A is a diagram to show an example of a list related to time domain resource allocation for the PDSCH for which the UE is configured. A row index r in the figure corresponds to a value of a time domain resource allocation field included in the DCI.

$K_0$ represents the number of symbols from PDCCH (DCI) reception to PDSCH reception. Start represents an index S of the start symbol in the slot of the PDSCH. Length indicates the length (number of symbols) of the PDSCH. A mapping type indicates a resource allocation type of the PDSCH (A or B).

FIG. 2B shows the candidate PDSCH occasions corresponding to the list of FIG. 2A. For example, the candidate PDSCH occasion corresponding to r=0 corresponds to a period having the length of 4 symbols starting from symbol #2. The UE can generate only one HARQ-ACK bit according to a certain rule for overlapping candidate PDSCH occasions.

The candidate PDSCH occasion corresponding to the slot of $K_1=7$ of FIG. 1 is not the candidate PDSCH occasion that is excluded because the slot is the full DL slot, and r={0, 1, 2, 3, 4, 5, 6, 7, 8} of FIG. 2B respectively corresponds to j={0, 1, 2, 0, 0, 1, 2, 3, 4}. Here, j is an index indicating correspondence to which bit of the HARQ-ACK codebook transmitted in slot n+9. Thus, up to here, it is a set $M_{A,c}$ of the candidate PDSCH occasions={0, 1, 2, 3, 4}.

Note that, in the present example, it is assumed that SPS release that the UE receives in a slot corresponding to $K_1=7$ of FIG. 1 is SPS release related to the SPS PDSCH corresponding to r=8 of FIG. 2A. In this case, j=4 is the PDSCH occasion corresponding to the SPS PDSCH, and is the PDSCH occasion corresponding to the SPS release.

The candidate PDSCH occasion corresponding to the slot of $K_1=6$ of FIG. 1 has the last two symbols of its slot being UL symbols, and thus the candidate PDSCH occasions corresponding to r=2, 3, 8 are excluded, and r={0, 1, 4, 5, 6, 7} of FIG. 2B respectively corresponds to j={5, 6, 5, 6, 7, 8}. Thus, up to here, it is a set $M_{A,c}$ of the candidate PDSCH occasions={0, 1, 2, 3, 4, 5, 6, 7, 8}.

The candidate PDSCH occasion corresponding to the slot of $K_1=5$ of FIG. 1 has its slot being the full UL slot, and thus the candidate PDSCH occasion corresponding to all of r is excluded. Thus, finally, it is a set $M_{A,c}$ of the candidate PDSCH occasions={0, 1, 2, 3, 4, 5, 6, 7, 8}.

Incidentally, in NR of Rel. 16 or later versions, for the sake of more flexible control, configuration of a plurality of SPSs (multiple SPSs) in one cell group has been under study. The UE may use a plurality of SPS configurations for one or a plurality of serving cells. For example, the UE may activate or deactivate the plurality of SPS configurations for a certain Bandwidth Part (BWP) of a certain serving cell, based on pieces of DCI different from each other.

Further, in NR of Rel. 16 or later versions, activation of the plurality of SPS configurations by using one piece of SPS activation DCI has been under study. The SPS activation DCI as described above may be referred to as SPS activation DCI for a plurality of SPS configurations, joint SPS activation DCI, or the like.

Further, in NR of Rel. 16 or later versions, deactivation of a plurality of SPS configurations by using one SPS release has been under study. The SPS release as described above may be referred to as SPS release for a plurality of SPS configurations, joint SPS release, or the like.

However, how the HARQ-ACK for joint SPS release is configured and how the HARQ-ACK is reported have not yet been studied. Unless these are clearly defined, appropriate HARQ control cannot be performed when a plurality of SPSs are used, which may result in deterioration of communication throughput or the like.

In the light of this, the inventors of the present invention came up with the idea of a method for appropriately generating the HARQ-ACK codebook even when joint SPS release is used. According to an aspect of the present invention, the HARQ-ACK for joint SPS release can be appropriately included in one HARQ-ACK codebook.

Embodiments according to the present disclosure will be described in detail below with reference to the drawings. A radio communication method according to each embodiment may be individually applied, or may be applied in combination.

Description of each embodiment is given based on the assumption that configuration of a subcarrier spacing (SCS)

of a DL and configuration of an SCS of a UL are the same. However, the scope to which the present disclosure is applied is not limited to this, and these configurations may be different.

Note that, in the present disclosure, generation, determination, transmission, and the like of the HARQ-ACK (or the HARQ-ACK codebook) may be interchangeably interpreted as each other.

Radio Communication Method

First Embodiment

The first embodiment relates to the positions of the HARQ-ACKs for joint SPS release in a semi-static codebook.

The positions of the HARQ-ACKs for joint SPS release may be the same as all of the positions of the HARQ-ACKs for reception of a plurality of SPS PDSCHs corresponding to the joint SPS release (Embodiment 1-1). In this case, the UE determines a plurality of positions of the HARQ-ACKs for joint SPS release in the semi-static codebook.

According to the configuration of Embodiment 1-1, the positions of the HARQ-ACKs for joint SPS release can be easily determined, and thus there is a small UE load.

The positions of the HARQ-ACKs for joint SPS release may be the same as one of the positions of the HARQ-ACKs for reception of a plurality of SPS PDSCHs corresponding to the joint SPS release (Embodiment 1-2). In this case, the UE determines one position of the HARQ-ACK for joint SPS release in the semi-static codebook.

In Embodiment 1-2, the UE may determine the position of one HARQ-ACK for joint SPS release according to a certain rule. The UE may determine the position of the HARQ-ACK, based on the SPS configuration related to the SPS PDSCH corresponding to joint SPS release, and may determine based on at least one of the following, for example.

Embodiment 1-2-1: Candidate SPS PDSCH reception occasions (also referred to as candidate PDSCH occasions, or simply occasions) belonging to the SPS configuration with an SPS configuration index being a specific value (for example, the minimum or the maximum) out of the SPS configurations corresponding to joint SPS release Embodiment 1-2-2: Occasions belonging to the SPS configuration with an SPS period being a specific value (for example, the minimum or the maximum) out of the SPS configurations corresponding to joint SPS release Embodiment 1-2-3: Occasions belonging to the SPS configuration with the length (duration) of the SPS being a specific value (for example, the minimum or the maximum) out of the SPS configurations corresponding to joint SPS release Embodiment 1-2-4: Occasions belonging to the SPS configuration with the start symbol of SPS being a specific value (for example, the earliest or the latest) out of the SPS configurations corresponding to joint SPS release Note that the "SPS configuration" regarding Embodiments 1-2-3 and 1-2-4 may mean the SPS configuration in which information (for example, a Start and Length Indicator (SLIV)) indicating a combination of a start symbol S and length L identified by the SPS activation DCI for activating the SPS configuration indicates the start symbol or the length of a specific value.

In Embodiment 1-2, the UE may determine the position of one HARQ-ACK for joint SPS release, according to a report from the base station. The UE may determine the position of the HARQ-ACK, based on an explicit indication, or may determine the position, based on one or a plurality of fields (for example, a HARQ process number field, a redundancy version field, or the like) of the DCI for indicating joint SPS release, for example (Embodiment 1-2-5).

The UE may determine the position of the HARQ-ACK, based on an implicit indication, or may determine the position, based on a configuration parameter for joint SPS release and a configuration parameter for the SPS PDSCH corresponding to the joint SPS release, for example (Embodiment 1-2-6). For example, when the HARQ-ACK timing for joint SPS release is the same as (or larger than, or smaller than) the HARQ-ACK timing for a specific SPS PDSCH corresponding to the joint SPS release, the UE may determine the position of the HARQ-ACK for joint SPS release, based on a specific SPS PDSCH occasion corresponding to the joint SPS release.

Note that, in Embodiment 1-2-6, the UE may assume that the HARQ-ACK timing for joint SPS release is scheduled so as to be the same as (or larger than, or smaller than) the HARQ-ACK timing for any one SPS PDSCH corresponding to the joint SPS release.

According to the configurations of Embodiments 1-2-1 to 1-2-4, the positions of the HARQ-ACKs for joint SPS release can be further reduced, and thus enhancement of throughput can be expected. Further, for example, the SPS PDSCH candidate positions at which the HARQ-ACKs related to joint SPS release are not transmitted can be used for scheduling other PDSCHs, and thus restriction of scheduling is reduced. According to the configurations of Embodiments 1-2-5 to 1-2-6, the positions of the HARQ-ACKs for joint SPS release can be flexibly controlled, and the degree of freedom of scheduling can further ben enhanced.

Figure 3A:
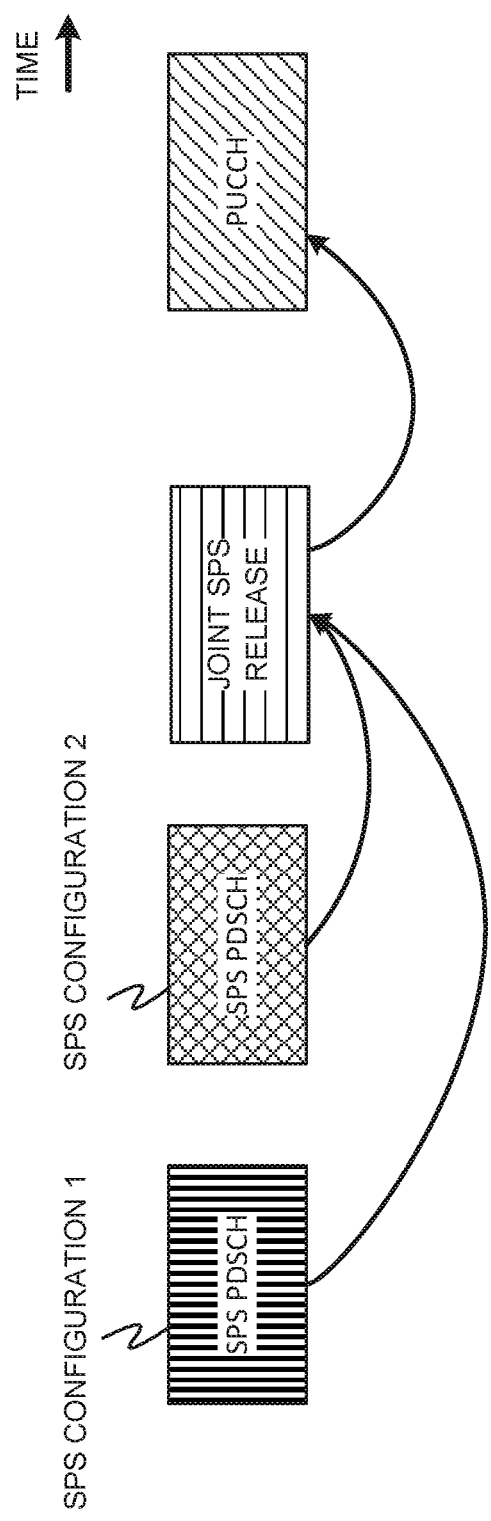
FIGS. 3A and 3B are each a diagram to show a hypothetical case used for description.
Figure 3B:
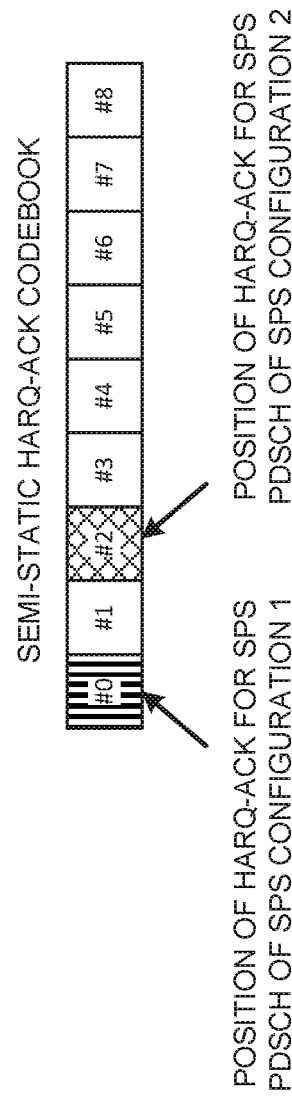

FIGS. 3A and 3B are each a diagram to show a hypothetical case used for description. As shown in FIG. 3A, the UE is configured with two SPS configurations (SPS configurations 1 and 2) in a certain cell, receives joint SPS release for these, generates the HARQ-ACKs for the joint SPS release, based on the semi-static codebook, and transmits the HARQ-ACKs by using the PUCCH.

In the present example, it is assumed that the PUCCH corresponds to the case of FIG. 1, and a list related to time domain resource allocation for the PDSCH of FIG. 2A is configured. It is assumed that SPS release of FIG. 1 is joint SPS release. Note that, in the following examples of the present disclosure as well, unless otherwise specifically noted, description based on the configurations shown in FIG. 1 to FIGS. 3A and 3B is given, but the scope to which each embodiment is applied is not limited to the case in which these configurations are applied.

It is assumed that SPS configuration 1 of FIG. 3A corresponds to the SPS configuration of r=0 of FIG. 2A in which the period is 5 slots, and SPS configuration 2 corresponds to the SPS configuration of r=6 of FIG. 2A in which the period is 2 slots.

FIG. 3B shows the semi-static HARQ-ACK codebook for the set $M_{A,c}=\{0, 1, 2, 3, 4, 5, 6, 7, 8\}$ for the candidate PDSCH occasion corresponding to FIG. 2A as described above.

The position of the HARQ-ACK for the SPS PDSCH of SPS configuration 1 corresponds to candidate PDSCH occasion (also simply referred to as occasion) #0. The position of the HARQ-ACK for the SPS PDSCH of SPS configuration 2 corresponds to occasion #2.

In the case of Embodiment 1-1, the position of the HARQ-ACK for joint SPS release is the same as the position of the HARQ-ACK for reception of two SPS PDSCHs corresponding to the joint SPS release, and thus corresponds to occasions #0 and #2 of FIG. 3B.

In the case of Embodiment 1-2-1, the position of the HARQ-ACK for joint SPS release is the same as, for example, the position of the HARQ-ACK for the occasion with the SPS configuration index belonging to the minimum SPS configuration (that is, SPS configuration 1), and thus corresponds to occasion #0 of FIG. 3B.

In the case of Embodiment 1-2-2, the position of the HARQ-ACK for joint SPS release is the same as, for example, the position of the HARQ-ACK for the occasion with the SPS period belonging to the shortest SPS configuration (that is, SPS configuration 2), and thus corresponds to occasion #2 of FIG. 3B.

In the case of Embodiment 1-2-3, the position of the HARQ-ACK for joint SPS release is the same as, for example, the position of the HARQ-ACK for the occasion with the length of the activated SPS belonging to the shortest SPS configuration (that is, SPS configuration 2), and thus corresponds to occasion #2 of FIG. 3B.

In the case of Embodiment 1-2-4, the position of the HARQ-ACK for joint SPS release is the same as, for example, the position of the HARQ-ACK for the occasion with the length of the start symbol of the activated SPS belonging to the earliest SPS configuration (that is, SPS configuration 1), and thus corresponds to occasion #0 of FIG. 3B.

In the case of Embodiment 1-2-5, the position of the HARQ-ACK for joint SPS release may be determined to be the same as, for example, the position of the HARQ-ACK for the occasion belonging to SPS configuration index 1 if the HARQ process number field included in the DCI (for example, DCI format 1_0) of the joint SPS release is "000", the position of the HARQ-ACK for the occasion belonging to SPS configuration index 2 if the HARQ process number field is "001", or the like.

The position of the HARQ-ACK for joint SPS release is the same as the position of the HARQ-ACK for the occasion belonging to SPS configuration 2 if the HARQ process number field included in the DCI for the joint SPS release is "001", and thus corresponds to occasion #2 of FIG. 3B.

The following will describe Embodiment 1-2-6 by assuming HARQ-ACK timing (HARQ-ACK timing indicated by the DCI used to activate SPS configuration 1) $K_{1,1}=7$ corresponding to SPS configuration 1, HARQ-ACK timing (HARQ-ACK timing indicated by the DCI used to activate SPS configuration 2) $K_{1,2}=6$ corresponding to SPS configuration 2, and HARQ-ACK timing $K_{1,j}=7$ corresponding to joint SPS release.

If the SPS PDSCH including the HARQ-ACK timing the same as HARQ-ACK timing $K_1$, for joint SPS release corresponds to the joint SPS release, the UE determines the position of the HARQ-ACK for the joint SPS release, based on the SPS PDSCH occasion. In the present example, $K_{1,j}=K_{1,1}=7$, and thus the UE may assume that the position of the HARQ-ACK for joint SPS release is the same as the position of the HARQ-ACK for the occasion belonging to SPS configuration 1, and determine that it is occasion #0 of FIG. 3B.

Note that, when a plurality of positions of the HARQ-ACKs for joint SPS release according to a certain rule out of the rules of Embodiments 1-2-1 to 1-2-6 are determined, the UE may determine one of these according to yet another rule.

According to the first embodiment described above, the UE can appropriately identify the position of the HARQ-ACK for joint SPS release, and generate the type 2 HARQ-ACK codebook. On the condition that the base station understands the configuration order, transmission and reception processing can be appropriately controlled without causing inconsistency of the codebook between the UE and the base station.

Second Embodiment

Not necessarily all of the positions of the HARQ-ACKs for joint SPS release in the semi-static codebook described in the first embodiment need to be used for HARQ-ACK transmission.

In view of this, the second embodiment relates to as which of the bit at which position the results of the ACK/NACK (that is, valid ACK/NACK, valid HARQ-ACK) for joint SPS release in the semi-static codebook are generated (transmitted). In the present disclosure, generation and transmission may be interchangeably interpreted as each other.

Case where there are Plurality of Positions of HARQ-ACKs for One Joint SPS Release If there are a plurality of positions of the HARQ-ACKs for one joint SPS release as with the case of Embodiment 1-1, the UE may transmit the valid ACK/NACK for the joint SPS release at all of these positions (Embodiment 2-1).

According to the configuration of Embodiment 2-1, it is expected that the probability that the base station can receive the valid ACK/NACK improves.

If there are a plurality of positions of the HARQ-ACKs for one joint SPS release, the UE may transmit the valid ACK/NACK for the joint SPS release by using only one of these positions, and may transmit an invariably specific fixed value at the rest of the positions (Embodiment 2-2).

The specific fixed value may be an ACK (or 1), or may be a NACK (or 0).

According to the configuration of Embodiment 2-2, the base station may use the fixed value at the rest of the positions as a virtual CRC bit, and it is expected that received quality of the valid ACK/NACK improves.

If there are a plurality of positions of the HARQ-ACK for one joint SPS release, the UE may transmit the valid ACK/NACK for the joint SPS release by using only one of these positions, and transmit the ACK/NACK for other PDSCH (for example, dynamically scheduled PDSCH) at the rest of the positions (Embodiment 2-3). Note that the UE may transmit a specific fixed value similar to that of Embodiment 2-2 at positions at which the ACK/NACK for other PDSCH is not transmitted out of the rest of the positions.

According to the configuration of Embodiment 2-3, the SPS PDSCH candidate positions that are related to joint SPS release but are not used for transmission of the HARQ-ACK can be used for scheduling of other PDSCH, and restriction of scheduling is reduced.

Note that, in Embodiment 2-1 or 2-2, when the base station schedules joint SPS release for a certain UE, the base station may perform control of not scheduling other PDSCH (for example, dynamically scheduled PDSCH) in all of the plurality of PDSCH occasions corresponding to the joint SPS release in one slot.

The position in the semi-static codebook corresponding to the valid ACK/NACK according to Embodiment 2-2 may be determined by using at least one of the determination methods of one position of the HARQ-ACK for joint SPS release in the semi-static codebook described in Embodiment 1-2 (for example, the position of one HARQ-ACK determined in Embodiments 1-2-1 to 1-2-6 may be interpreted as the position of the valid ACK/NACK out of the positions of the plurality of HARQ-ACKs in Embodiment 2-2).

FIGS. 4A to 4C are each a diagram to show an example of Embodiments 2-1 and 2-2. FIG. 4A shows the semi-static HARQ-ACK codebook for the set $M_{A,c}=\{0, 1, 2, 3, 4, 5, 6, 7, 8\}$ of the candidate PDSCH occasion corresponding to FIG. 2A. In the present example, it is assumed that three SPS configurations (SPS configurations 1, 2, and 3) are deactivated with joint SPS release.

It is assumed that occasion #0 corresponds to the SPS PDSCH of SPS configuration 1, occasion #2 corresponds to the SPS PDSCH of SPS configuration 2, and occasion #6 corresponds to the SPS PDSCH of SPS configuration 3. In the present example, the position of the HARQ-ACK for one joint SPS release corresponds to occasions #0, #2, and #6.

FIG. 4B is a diagram to show an example of details of the ACK/NACK according to Embodiment 2-1. In the case of Embodiment 2-1, the UE generates the codebook so as to include the valid ACK/NACK bit for joint SPS release in all of occasions #0, #2, and #6.

FIG. 4C is a diagram to show an example of details of the ACK/NACK according to Embodiment 2-2. In the case of Embodiment 2-2, the UE generates the codebook so as to include the valid ACK/NACK bit for joint SPS release in only one (in FIG. 4C, occasion #0) determined out of occasions #0, #2, and #6. The UE may consider the occasions (in FIG. 4C, occasions #2 and #6) of the rest of the SPS PDSCH corresponding to joint SPS release as a fixed value (in FIG. 4C, a NACK (0)).

FIGS. 5A and 5B are each a diagram to show an example of Embodiment 2-3. In the present example, it is assumed that, as shown in FIG. 4A, the position of the HARQ-ACK for one joint SPS release corresponds to occasions #0, #2, and #6.

FIG. 5A is a diagram to show an example of the candidate PDSCH occasion in a slot (for example, slot n+2 in FIG. 1) corresponding to the PUCCH. In FIG. 5A, each occasion is included in the same slot, but may be included in different slots.

In the present example, the UE generates the codebook so as to include the valid ACK/NACK bit for joint SPS release in only occasion #0 determined out of occasions #0, #2, and #6. Here, the rest of occasions #2 and #6 may be used for the dynamic PDSCH; however, the base station schedules a certain PDSCH (PDSCH X) for the UE in occasion #2, and does not schedule the PDSCH for the UE in occasion #6.

FIG. 5B is a diagram to show an example of details of the ACK/NACK according to Embodiment 2-3. In the case of Embodiment 2-3, the UE generates the codebook so as to include the valid ACK/NACK bit for joint SPS release in only one (in FIG. 5B, occasion #0) determined out of occasions #0, #2, and #6. The UE may generate the valid ACK/NACK for scheduled PDSCH X regarding occasion #2. Further, the UE may generate a fixed value (in FIG. 5B, a NACK (0)) because nothing is scheduled regarding occasion #6.

Case where there is Only One Position of HARQ-ACK for One Joint SPS Release

If there is only one position of the HARQ-ACK for one joint SPS release as with the case of Embodiment 1-2, the UE may transmit the valid ACK/NACK for the joint SPS release at the position (Embodiment 2-4).

The UE may transmit the ACK/NACK for other PDSCH (for example, dynamically scheduled PDSCH) at the position of the HARQ-ACK for other SPS PDSCH candidate that is different from the above position. Note that the UE may transmit a specific fixed value similar to that of Embodiment 2-2 at positions at which the ACK/NACK for other PDSCH is not transmitted out of the positions of the HARQ-ACKs for other SPS PDSCH candidate.

Note that whether or not such scheduling as to transmit the ACK/NACK for other PDSCH at the position of the HARQ-ACK for other SPS PDSCH candidate other than the position of transmitting the valid ACK/NACK for joint SPS release is permitted may be dependent upon implementation of the base station.

Figure 6A:
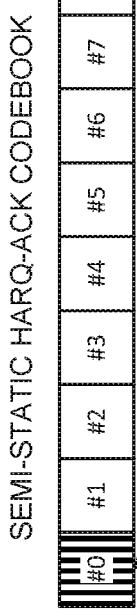
FIGS. 6A to 6C are each a diagram to show an example of Embodiment 2-4.
Figure 6B:
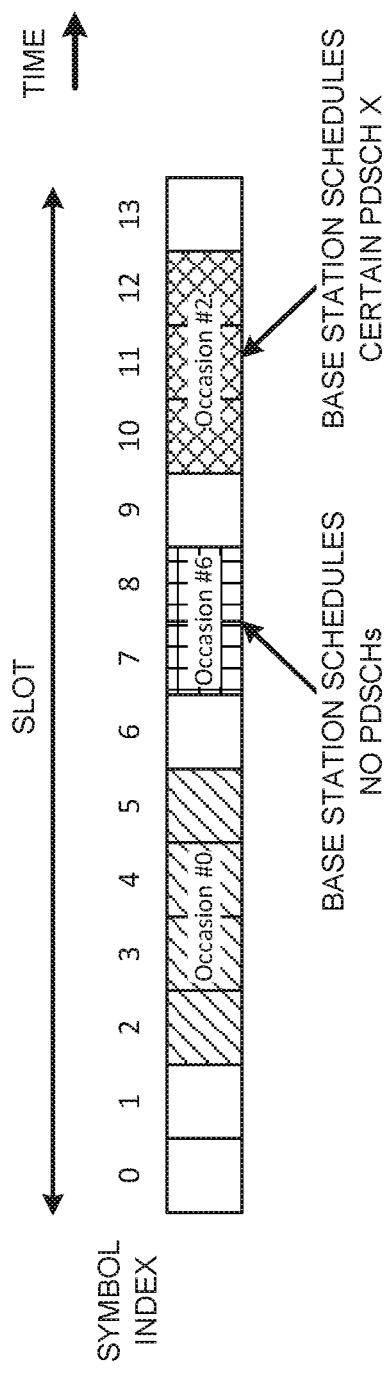
Figure 6C:
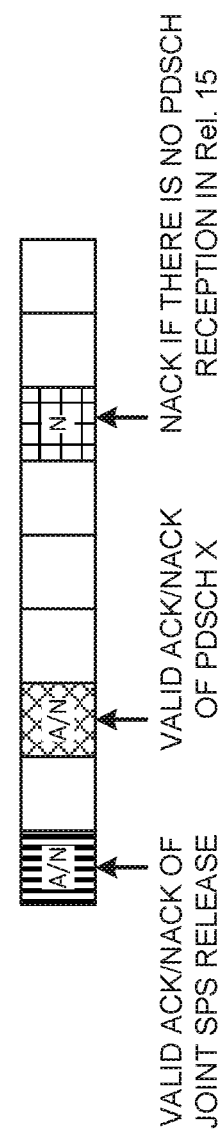

FIGS. 6A to 6C are each a diagram to show an example of Embodiment 2-4. FIG. 6A shows the semi-static HARQ-ACK codebook for the set $M_{A,c}=\{0, 1, 2, 3, 4, 5, 6, 7, 8\}$ of the candidate PDSCH occasion corresponding to FIG. 2A. The difference from FIG. 4A lies in that it is determined that the position of the HARQ-ACK for one joint SPS release is occasion #0 corresponding to the SPS PDSCH of SPS configuration 1.

FIG. 6B is a diagram to show an example of the candidate PDSCH occasion in a slot (for example, slot n+2 in FIG. 1) corresponding to the PUCCH. In FIG. 6B, each occasion is included in the same slot, but may be included in different slots.

In the present example, the UE generates the codebook so as to include the valid ACK/NACK bit for joint SPS release in only occasion #0 determined out of occasions #0, #2, and #6. Here, the rest of occasions #2 and #6 may be used for the dynamic PDSCH; however, the base station schedules a certain PDSCH (PDSCH X) for the UE in occasion #2, and does not schedule the PDSCH for the UE in occasion #6.

FIG. 6C is a diagram to show an example of details of the ACK/NACK according to Embodiment 2-4. In the case of Embodiment 2-4, the UE generates the codebook so as to include the valid ACK/NACK bit for joint SPS release in only occasion #0 being the position of the HARQ-ACK for the joint SPS release. The UE may generate the valid ACK/NACK for scheduled PDSCH X regarding occasion #2 related to the joint SPS release. Further, the UE may generate a NACK (0) because nothing is scheduled regarding occasion #6 related to the joint SPS release.

According to the second embodiment described above, the UE can appropriately identify the position of the valid ACK/NACK for joint SPS release, and generate the type 2 HARQ-ACK codebook. On the condition that the base station understands the configuration order, transmission and reception processing can be appropriately controlled without causing inconsistency of the codebook between the UE and the base station.

Additional Notes

Each embodiment described above is described based on the assumption of a case in which each embodiment is applied to a case in which the UE is configured with the semi-static codebook (type 1 HARQ-ACK codebook). However, each embodiment may be applied to a case in which the UE is configured with the dynamic codebook (type 2 HARQ-ACK codebook).

Note that each embodiment described above is described on the assumption that the position of the HARQ-ACK for a certain SPS PDSCH occasion is determined similarly to Rel. 15 NR. However, this is not restrictive. Even when the position of the HARQ-ACK for the SPS PDSCH occasion is changed in Rel. 16 or later versions, each embodiment of the present disclosure can be applied.

Radio Communication System

Hereinafter, a structure of a radio communication system according to one embodiment of the present disclosure will be described. In this radio communication system, the radio communication method according to each embodiment of the present disclosure described above may be used alone or may be used in combination for communication.

Figure 7:
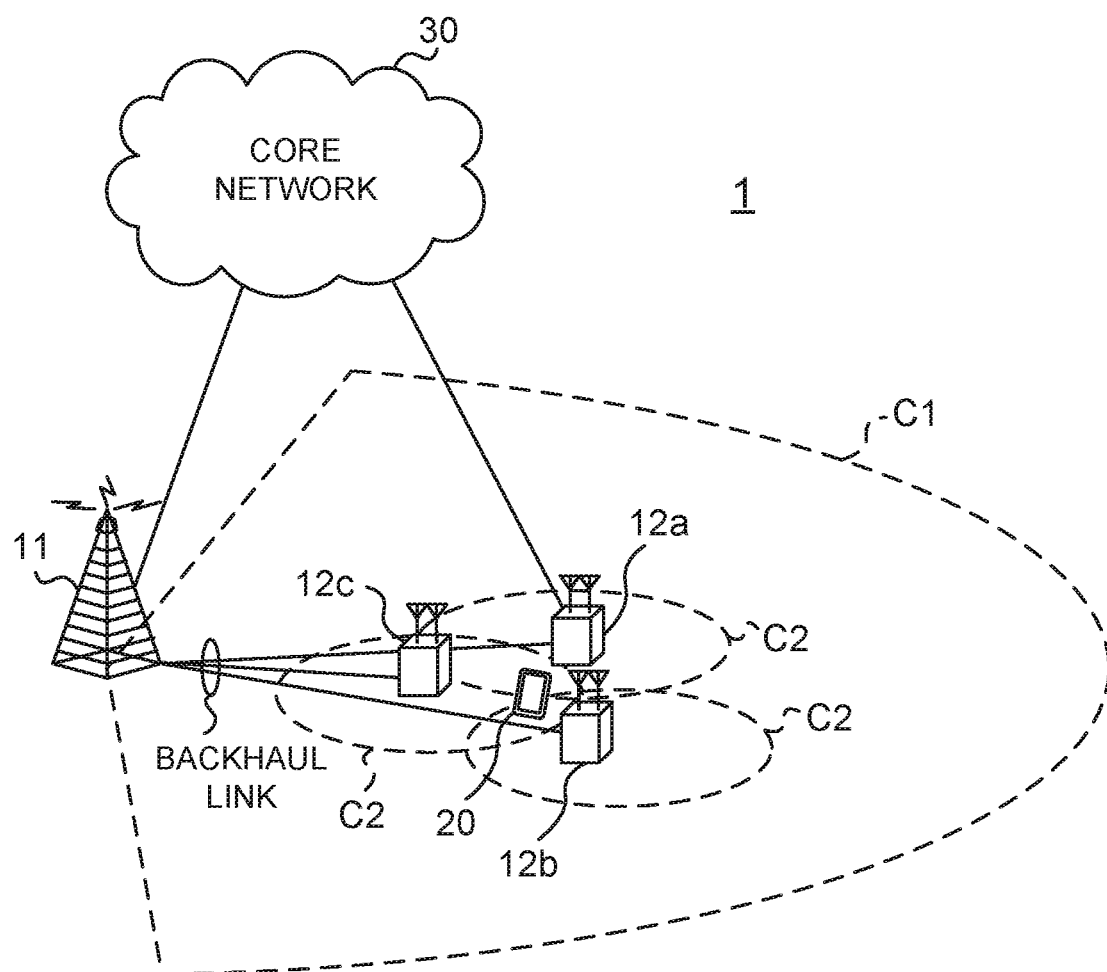
FIG. 7 is a diagram to show an example of a schematic structure of a radio communication system according to one embodiment.

FIG. 7 is a diagram to show an example of a schematic structure of the radio communication system according to one embodiment. The radio communication system 1 may be a system implementing a communication using Long Term Evolution (LTE), 5th generation mobile communication system New Radio (5G NR) and so on on the specifications of which have been drafted by Third Generation Partnership Project (3GPP).

The radio communication system 1 may support dual connectivity (multi-RAT dual connectivity (MR-DC)) between a plurality of Radio Access Technologies (RATs). The MR-DC may include dual connectivity (E-UTRA-NR Dual Connectivity (EN-DC)) between LTE (Evolved Universal Terrestrial Radio Access (E-UTRA)) and NR, dual connectivity (NR-E-UTRA Dual Connectivity (NE-DC)) between NR and LTE, and so on.

In EN-DC, a base station (eNB) of LTE (E-UTRA) is a master node (MN), and a base station (gNB) of NR is a secondary node (SN). In NE-DC, a base station (gNB) of NR is an MN, and a base station (eNB) of LTE (E-UTRA) is an SN.

The radio communication system 1 may support dual connectivity between a plurality of base stations in the same RAT (for example, dual connectivity (NR-NR Dual Connectivity (NN-DC)) where both of an MN and an SN are base stations (gNB) of NR).

The radio communication system 1 may include a base station 11 that forms a macro cell C1 of a relatively wide coverage, and base stations 12 (12a to 12c) that form small cells C2, which are placed within the macro cell C1 and which are narrower than the macro cell C1. The user terminal 20 may be located in at least one cell. The arrangement, the number, and the like of each cell and user terminal 20 are by no means limited to the aspect shown in the diagram. Hereinafter, the base stations 11 and 12 will be collectively referred to as "base stations 10," unless specified otherwise.

The user terminal 20 may be connected to at least one of the plurality of base stations 10. The user terminal 20 may use at least one of carrier aggregation (CA) and dual connectivity (DC) using a plurality of component carriers (CCs).

Each CC may be included in at least one of a first frequency band (Frequency Range 1 (FR1)) and a second frequency band (Frequency Range 2 (FR2)). The macro cell C1 may be included in FR1, and the small cells C2 may be included in FR2. For example, FR1 may be a frequency band of 6 GHz or less (sub-6 GHz), and FR2 may be a frequency band which is higher than 24 GHz (above-24 GHz). Note that frequency bands, definitions and so on of FR1 and FR2 are by no means limited to these, and for example, FR1 may correspond to a frequency band which is higher than FR2.

The user terminal 20 may communicate using at least one of time division duplex (TDD) and frequency division duplex (FDD) in each CC.

The plurality of base stations 10 may be connected by a wired connection (for example, optical fiber in compliance with the Common Public Radio Interface (CPRI), the X2 interface and so on) or a wireless connection (for example, an NR communication). For example, if an NR communication is used as a backhaul between the base stations 11 and 12, the base station 11 corresponding to a higher station may be referred to as an "Integrated Access Backhaul (IAB) donor," and the base station 12 corresponding to a relay station (relay) may be referred to as an "IAB node."

The base station 10 may be connected to a core network 30 through another base station 10 or directly. For example, the core network 30 may include at least one of Evolved Packet Core (EPC), 5G Core Network (5GCN), Next Generation Core (NGC), and so on.

The user terminal 20 may be a terminal supporting at least one of communication schemes such as LTE, LTE-A, 5G, and so on.

In the radio communication system 1, an orthogonal frequency division multiplexing (OFDM)-based wireless access scheme may be used. For example, in at least one of the downlink (DL) and the uplink (UL), Cyclic Prefix OFDM (CP-OFDM), Discrete Fourier Transform Spread OFDM (DFT-s-OFDM), Orthogonal Frequency Division Multiple Access (OFDMA), Single Carrier Frequency Division Multiple Access (SC-FDMA), and so on may be used.

The wireless access scheme may be referred to as a "waveform." Note that, in the radio communication system 1, another wireless access scheme (for example, another single carrier transmission scheme, another multi-carrier transmission scheme) may be used for a wireless access scheme in the UL and the DL.

In the radio communication system 1, a downlink shared channel (Physical Downlink Shared Channel (PDSCH)), which is used by each user terminal 20 on a shared basis, a broadcast channel (Physical Broadcast Channel (PBCH)), a downlink control channel (Physical Downlink Control Channel (PDCCH)) and so on, may be used as downlink channels.

In the radio communication system 1, an uplink shared channel (Physical Uplink Shared Channel (PUSCH)), which is used by each user terminal 20 on a shared basis, an uplink control channel (Physical Uplink Control Channel (PUCCH)), a random access channel (Physical Random Access Channel (PRACH)) and so on may be used as uplink channels.

User data, higher layer control information, System Information Blocks (SIBs) and so on are communicated on the PDSCH. User data, higher layer control information and so on may be communicated on the PUSCH. The Master Information Blocks (MIBs) may be communicated on the PBCH.

Lower layer control information may be communicated on the PDCCH. For example, the lower layer control information may include downlink control information (DCI) including scheduling information of at least one of the PDSCH and the PUSCH.

Note that DCI for scheduling the PDSCH may be referred to as "DL assignment," "DL DCI," and so on, and DCI for scheduling the PUSCH may be referred to as "UL grant," "UL DCI," and so on. Note that the PDSCH may be interpreted as "DL data", and the PUSCH may be interpreted as "UL data".

For detection of the PDCCH, a control resource set (CORESET) and a search space may be used. The CORESET corresponds to a resource to search DCI. The search space corresponds to a search area and a search method of PDCCH candidates. One CORESET may be associated with one or more search spaces. The UE may monitor a CORESET associated with a certain search space, based on search space configuration.

One search space may correspond to a PDCCH candidate corresponding to one or more aggregation levels. One or more search spaces may be referred to as a "search space set." Note that a "search space," a "search space set," a "search space configuration," a "search space set configuration," a "CORESET," a "CORESET configuration" and so on of the present disclosure may be interchangeably interpreted.

Uplink control information (UCI) including at least one of channel state information (CSI), transmission confirmation information (for example, which may be also referred to as Hybrid Automatic Repeat reQuest ACKnowledgement (HARQ-ACK), ACK/NACK, and so on), and scheduling request (SR) may be communicated by means of the PUCCH. By means of the PRACH, random access preambles for establishing connections with cells may be communicated.

Note that the downlink, the uplink, and so on in the present disclosure may be expressed without a term of "link." In addition, various channels may be expressed without adding "Physical" to the head.

In the radio communication system 1, a synchronization signal (SS), a downlink reference signal (DL-RS), and so on may be communicated. In the radio communication system 1, a cell-specific reference signal (CRS), a channel state information-reference signal (CSI-RS), a demodulation reference signal (DMRS), a positioning reference signal (PRS), a phase tracking reference signal (PTRS), and so on may be communicated as the DL-RS.

For example, the synchronization signal may be at least one of a primary synchronization signal (PSS) and a secondary synchronization signal (SSS). A signal block including an SS (PSS, SSS) and a PBCH (and a DMRS for a PBCH) may be referred to as an "SS/PBCH block," an "SS Block (SSB)," and so on. Note that an SS, an SSB, and so on may be also referred to as a "reference signal."

In the radio communication system 1, a sounding reference signal (SRS), a demodulation reference signal (DMRS), and so on may be communicated as an uplink reference signal (UL-RS). Note that DMRS may be referred to as a "user terminal specific reference signal (UE-specific Reference Signal)."

Base Station

Figure 8:
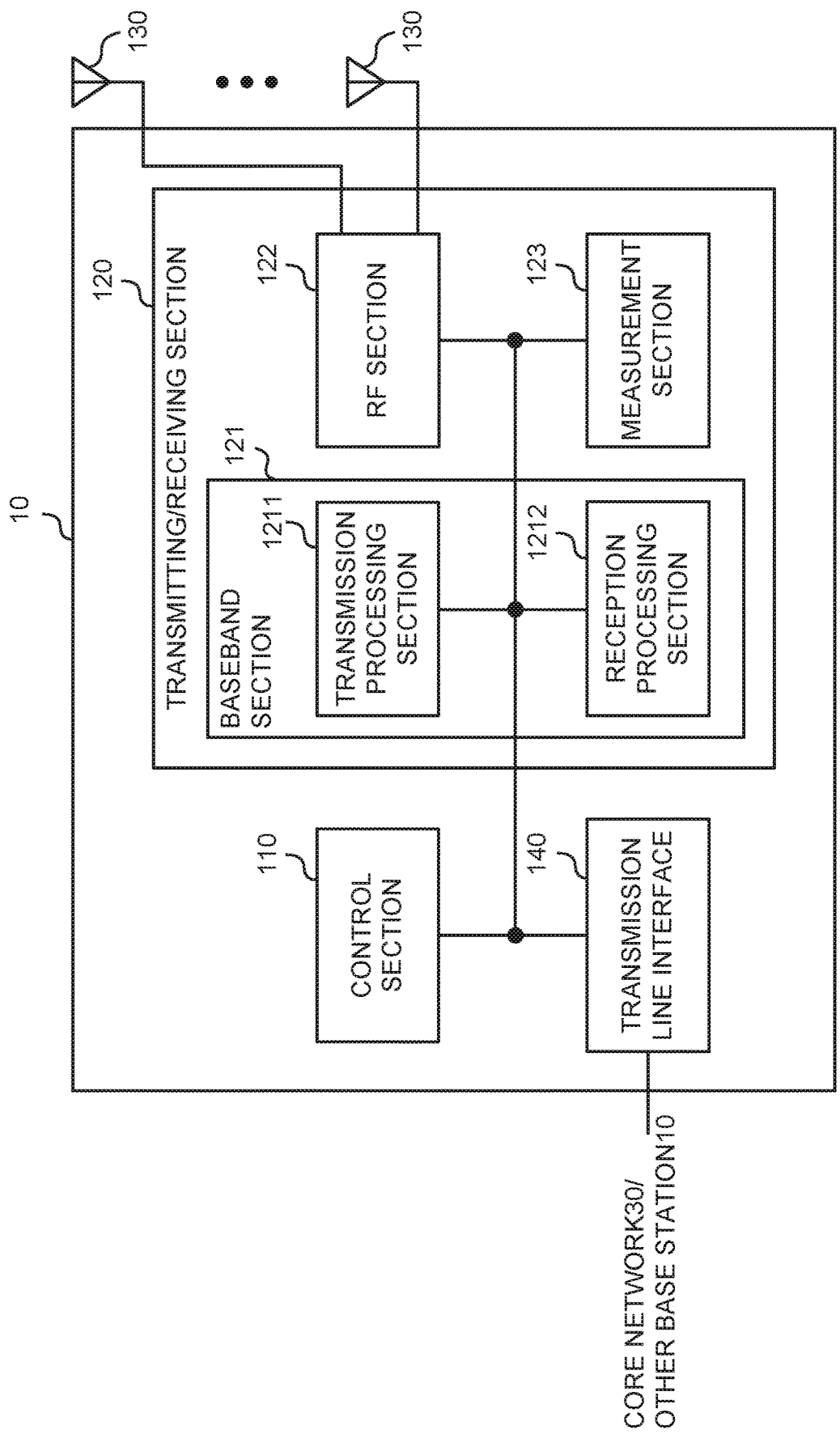
FIG. 8 is a diagram to show an example of a structure of a base station according to one embodiment.

FIG. 8 is a diagram to show an example of a structure of the base station according to one embodiment. The base station 10 includes a control section 110, a transmitting/receiving section 120, transmitting/receiving antennas 130 and a communication path interface (transmission line interface) 140. Note that the base station 10 may include one or more control sections 110, one or more transmitting/receiving sections 120, one or more transmitting/receiving antennas 130, and one or more communication path interfaces 140.

Note that, the present example primarily shows functional blocks that pertain to characteristic parts of the present embodiment, and it is assumed that the base station 10 may include other functional blocks that are necessary for radio communication as well. Part of the processes of each section described below may be omitted.

The control section 110 controls the whole of the base station 10. The control section 110 can be constituted with a controller, a control circuit, or the like described based on general understanding of the technical field to which the present disclosure pertains.

The control section 110 may control generation of signals, scheduling (for example, resource allocation, mapping), and so on. The control section 110 may control transmission and reception, measurement and so on using the transmitting/receiving section 120, the transmitting/receiving antennas 130, and the communication path interface 140. The control section 110 may generate data, control information, a sequence and so on to transmit as a signal, and forward the generated items to the transmitting/receiving section 120. The control section 110 may perform call processing (setting up, releasing) for communication channels, manage the state of the base station 10, and manage the radio resources.

The transmitting/receiving section 120 may include a baseband section 121, a Radio Frequency (RF) section 122, and a measurement section 123. The baseband section 121 may include a transmission processing section 1211 and a reception processing section 1212. The transmitting/receiving section 120 can be constituted with a transmitter/receiver, an RF circuit, a baseband circuit, a filter, a phase shifter, a measurement circuit, a transmitting/receiving circuit, or the like described based on general understanding of the technical field to which the present disclosure pertains.

The transmitting/receiving section 120 may be structured as a transmitting/receiving section in one entity, or may be constituted with a transmitting section and a receiving section. The transmitting section may be constituted with the transmission processing section 1211, and the RF section 122. The receiving section may be constituted with the reception processing section 1212, the RF section 122, and the measurement section 123.

The transmitting/receiving antennas 130 can be constituted with antennas, for example, an array antenna, or the like described based on general understanding of the technical field to which the present disclosure pertains.

The transmitting/receiving section 120 may transmit the above-described downlink channel, synchronization signal, downlink reference signal, and so on. The transmitting/receiving section 120 may receive the above-described uplink channel, uplink reference signal, and so on.

The transmitting/receiving section 120 may form at least one of a transmit beam and a receive beam by using digital beam forming (for example, precoding), analog beam forming (for example, phase rotation), and so on.

The transmitting/receiving section 120 (transmission processing section 1211) may perform the processing of the Packet Data Convergence Protocol (PDCP) layer, the processing of the Radio Link Control (RLC) layer (for example, RLC retransmission control), the processing of the Medium Access Control (MAC) layer (for example, HARQ retransmission control), and so on, for example, on data and control information and so on acquired from the control section 110, and may generate bit string to transmit.

The transmitting/receiving section 120 (transmission processing section 1211) may perform transmission processing such as channel coding (which may include error correction coding), modulation, mapping, filtering, discrete Fourier transform (DFT) processing (as necessary), inverse fast Fourier transform (IFFT) processing, precoding, digital-to-analog conversion, and so on, on the bit string to transmit, and output a baseband signal.

The transmitting/receiving section 120 (RF section 122) may perform modulation to a radio frequency band, filtering, amplification, and so on, on the baseband signal, and transmit the signal of the radio frequency band through the transmitting/receiving antennas 130.

On the other hand, the transmitting/receiving section 120 (RF section 122) may perform amplification, filtering, demodulation to a baseband signal, and so on, on the signal of the radio frequency band received by the transmitting/receiving antennas 130.

The transmitting/receiving section 120 (reception processing section 1212) may apply reception processing such as analog-digital conversion, fast Fourier transform (FFT) processing, inverse discrete Fourier transform (IDFT) processing (as necessary), filtering, de-mapping, demodulation, decoding (which may include error correction decoding), MAC layer processing, the processing of the RLC layer and the processing of the PDCP layer, and so on, on the acquired baseband signal, and acquire user data, and so on.

The transmitting/receiving section 120 (measurement section 123) may perform the measurement related to the received signal. For example, the measurement section 123 may perform Radio Resource Management (RRM) measurement, Channel State Information (CSI) measurement, and so on, based on the received signal. The measurement section 123 may measure a received power (for example, Reference Signal Received Power (RSRP)), a received quality (for example, Reference Signal Received Quality (RSRQ), a Signal to Interference plus Noise Ratio (SINR), a Signal to Noise Ratio (SNR)), a signal strength (for example, Received Signal Strength Indicator (RSSI)), channel information (for example, CSI), and so on. The measurement results may be output to the control section 110.

The communication path interface 140 may perform transmission/reception (backhaul signaling) of a signal with an apparatus included in the core network 30 or other base stations 10, and so on, and acquire or transmit user data (user plane data), control plane data, and so on for the user terminal 20.

Note that the transmitting section and the receiving section of the base station 10 in the present disclosure may be constituted with at least one of the transmitting/receiving section 120, the transmitting/receiving antennas 130, and the communication path interface 140.

Note that the transmitting/receiving section 120 may transmit downlink control information (DCI) (joint SPS release) for releasing a plurality of semi-persistent schedulings (SPSs) to the user terminal 20.

The transmitting/receiving section 120 may receive a HARQ-ACK information bit corresponding to a HARQ-ACK codebook that includes a Hybrid Automatic Repeat reQuest ACKnowledgement (HARQ-ACK) corresponding to the downlink control information at one or a plurality of positions by using one uplink control channel (PUCCH).

User Terminal

Figure 9:
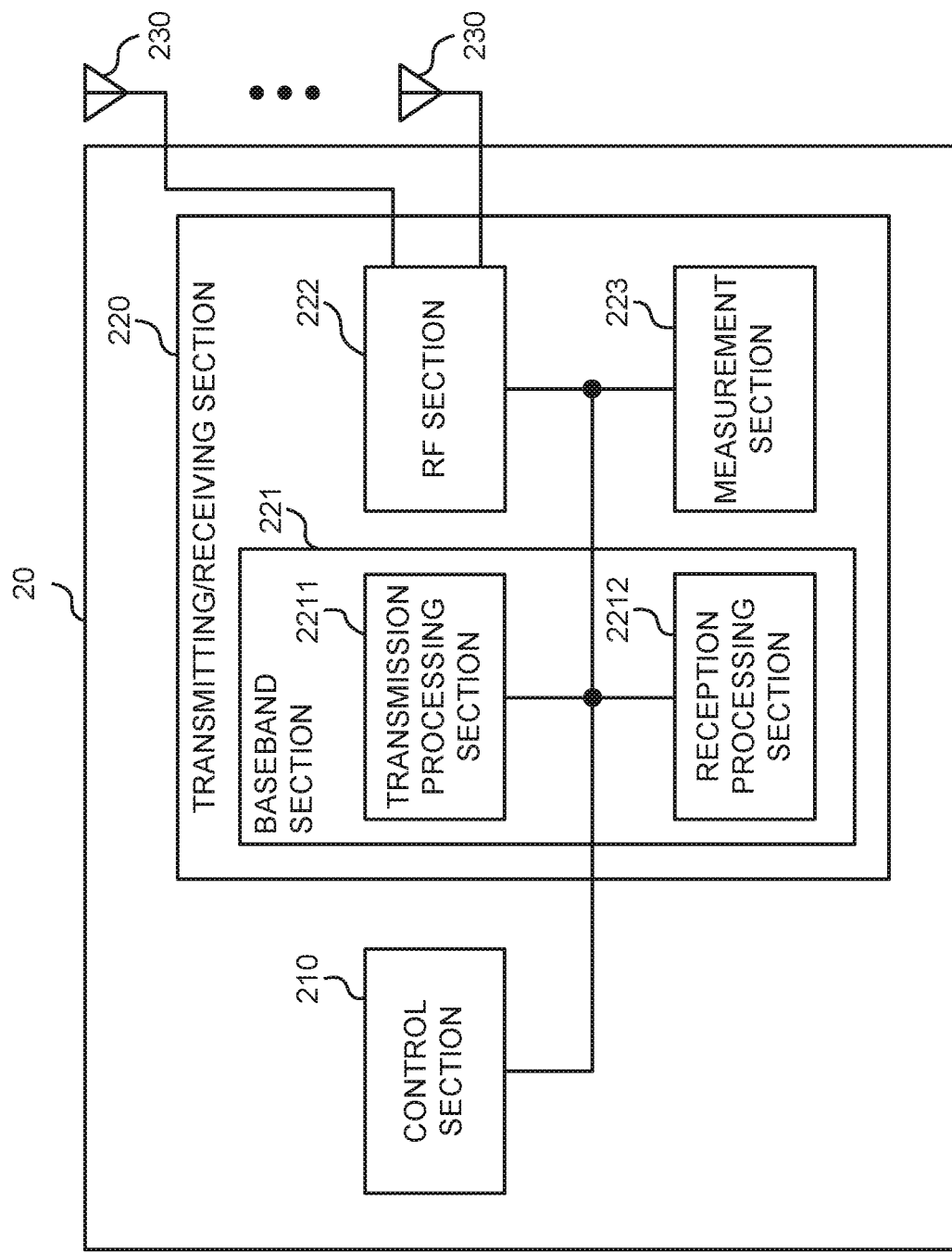
FIG. 9 is a diagram to show an example of a structure of a user terminal according to one embodiment.

FIG. 9 is a diagram to show an example of a structure of the user terminal according to one embodiment. The user terminal 20 includes a control section 210, a transmitting/receiving section 220, and transmitting/receiving antennas 230. Note that the user terminal 20 may include one or more control sections 210, one or more transmitting/receiving sections 220, and one or more transmitting/receiving antennas 230.

Note that, the present example primarily shows functional blocks that pertain to characteristic parts of the present embodiment, and it is assumed that the user terminal 20 may include other functional blocks that are necessary for radio communication as well. Part of the processes of each section described below may be omitted.

The control section 210 controls the whole of the user terminal 20. The control section 210 can be constituted with a controller, a control circuit, or the like described based on general understanding of the technical field to which the present disclosure pertains.

The control section 210 may control generation of signals, mapping, and so on. The control section 210 may control transmission/reception, measurement and so on using the transmitting/receiving section 220, and the transmitting/receiving antennas 230. The control section 210 generates data, control information, a sequence and so on to transmit as a signal, and may forward the generated items to the transmitting/receiving section 220.

The transmitting/receiving section 220 may include a baseband section 221, an RF section 222, and a measurement section 223. The baseband section 221 may include a transmission processing section 2211 and a reception processing section 2212. The transmitting/receiving section 220 can be constituted with a transmitter/receiver, an RF circuit, a baseband circuit, a filter, a phase shifter, a measurement circuit, a transmitting/receiving circuit, or the like described based on general understanding of the technical field to which the present disclosure pertains.

The transmitting/receiving section 220 may be structured as a transmitting/receiving section in one entity, or may be constituted with a transmitting section and a receiving section. The transmitting section may be constituted with the transmission processing section 2211, and the RF section 222. The receiving section may be constituted with the reception processing section 2212, the RF section 222, and the measurement section 223.

The transmitting/receiving antennas 230 can be constituted with antennas, for example, an array antenna, or the like described based on general understanding of the technical field to which the present disclosure pertains.

The transmitting/receiving section 220 may receive the above-described downlink channel, synchronization signal, downlink reference signal, and so on. The transmitting/receiving section 220 may transmit the above-described uplink channel, uplink reference signal, and so on.

The transmitting/receiving section 220 may form at least one of a transmit beam and a receive beam by using digital beam forming (for example, precoding), analog beam forming (for example, phase rotation), and so on.

The transmitting/receiving section 220 (transmission processing section 2211) may perform the processing of the PDCP layer, the processing of the RLC layer (for example, RLC retransmission control), the processing of the MAC layer (for example, HARQ retransmission control), and so on, for example, on data and control information and so on acquired from the control section 210, and may generate bit string to transmit.

The transmitting/receiving section 220 (transmission processing section 2211) may perform transmission processing such as channel coding (which may include error correction coding), modulation, mapping, filtering, DFT processing (as necessary), IFFT processing, precoding, digital-to-analog conversion, and so on, on the bit string to transmit, and output a baseband signal.

Note that, whether to apply DFT processing or not may be based on the configuration of the transform precoding. The transmitting/receiving section 220 (transmission processing section 2211) may perform, for a certain channel (for example, PUSCH), the DFT processing as the above-described transmission processing to transmit the channel by using a DFT-s-OFDM waveform if transform precoding is enabled, and otherwise, does not need to perform the DFT processing as the above-described transmission process.

The transmitting/receiving section 220 (RF section 222) may perform modulation to a radio frequency band, filtering, amplification, and so on, on the baseband signal, and transmit the signal of the radio frequency band through the transmitting/receiving antennas 230.

On the other hand, the transmitting/receiving section 220 (RF section 222) may perform amplification, filtering, demodulation to a baseband signal, and so on, on the signal of the radio frequency band received by the transmitting/receiving antennas 230.

The transmitting/receiving section 220 (reception processing section 2212) may apply a receiving process such as analog-digital conversion, FFT processing, IDFT processing (as necessary), filtering, de-mapping, demodulation, decoding (which may include error correction decoding), MAC layer processing, the processing of the RLC layer and the processing of the PDCP layer, and so on, on the acquired baseband signal, and acquire user data, and so on.

The transmitting/receiving section 220 (measurement section 223) may perform the measurement related to the received signal. For example, the measurement section 223 may perform RRM measurement, CSI measurement, and so on, based on the received signal. The measurement section 223 may measure a received power (for example, RSRP), a received quality (for example, RSRQ, SINR, SNR), a signal strength (for example, RSSI), channel information (for example, CSI), and so on. The measurement results may be output to the control section 210.

Note that the transmitting section and the receiving section of the user terminal 20 in the present disclosure may be constituted with at least one of the transmitting/receiving section 220 and the transmitting/receiving antennas 230.

Note that the transmitting/receiving section 220 may receive downlink control information (DCI) (joint SPS release) for releasing a plurality of semi-persistent schedulings (SPSs).

The control section 210 may generate a semi-static HARQ-ACK codebook including a Hybrid Automatic Repeat reQuest ACKnowledgement (HARQ-ACK) corresponding to the downlink control information at one or a plurality of positions. In other words, the control section 210 may determine so as to include a HARQ-ACK corresponding to the downlink control information at one or a plurality of positions of a semi-static HARQ-ACK codebook.

The control section 210 may determine so as to include the HARQ-ACK corresponding to the downlink control information at all of positions of the HARQ-ACK corresponding to downlink shared channel (Physical Downlink Shared Channel (PDSCH)) reception of the plurality of SPSs in the semi-static HARQ-ACK codebook.

The control section 210 may determine so as to include the HARQ-ACK corresponding to the downlink control information at only one of positions of the HARQ-ACK corresponding to downlink shared channel (Physical Downlink Shared Channel (PDSCH)) reception of the plurality of SPSs in the semi-static HARQ-ACK codebook.

The control section 210 may determine so as to include the HARQ-ACK corresponding to the downlink control information at only one of the positions of the HARQ-ACK corresponding to the PDSCH reception of SPS configuration with an SPS configuration index or a period out of the plurality of SPSs in the semi-static HARQ-ACK codebook corresponding to a specific value.

The control section 210 may determine so as to include the HARQ-ACK corresponding to the downlink control information at only one of the positions of the HARQ-ACK corresponding to the PDSCH reception of SPS configuration with a length or a start symbol of SPS out of the plurality of SPSs in the semi-static HARQ-ACK codebook corresponding to a specific value.

The control section 210 may perform control of including a valid Hybrid Automatic Repeat reQuest ACKnowledgement (HARQ-ACK) (valid ACK/NACK) corresponding to the downlink control information at at least one of a plurality of positions of HARQ-ACKs corresponding to downlink shared channel (Physical Downlink Shared Channel (PDSCH)) reception of the plurality of SPSs in a semi-static HARQ-ACK codebook.

The control section 210 may perform the control of including the valid HARQ-ACK corresponding to the downlink control information for all of the plurality of positions.

The control section 210 may perform the control of including the valid HARQ-ACK corresponding to the downlink control information at one of the plurality of positions, and including a specific fixed value (for example, 0 (NACK)) at a rest of positions.

The control section 210 may perform the control of including the valid HARQ-ACK corresponding to the downlink control information at one of the plurality of positions, and including the valid HARQ-ACK for a dynamically scheduled PDSCH at at least one of a rest of positions.

The control section 210 may determine that one of the plurality of positions at which the valid HARQ-ACK corresponding to the downlink control information is included is a position of the HARQ-ACK for the PDSCH reception with an SPS configuration index or a period corresponding to SPS configuration of a specific value out of the plurality of SPSs.

Hardware Structure

Note that the block diagrams that have been used to describe the above embodiments show blocks in functional units. These functional blocks (components) may be implemented in arbitrary combinations of at least one of hardware and software. Also, the method for implementing each functional block is not particularly limited. That is, each functional block may be realized by one piece of apparatus that is physically or logically coupled, or may be realized by directly or indirectly connecting two or more physically or logically separate pieces of apparatus (for example, via wire, wireless, or the like) and using these plurality of pieces of apparatus. The functional blocks may be implemented by combining softwares into the apparatus described above or the plurality of apparatuses described above.

Here, functions include judgment, determination, decision, calculation, computation, processing, derivation, investigation, search, confirmation, reception, transmission, output, access, resolution, selection, designation, establishment, comparison, assumption, expectation, considering, broadcasting, notifying, communicating, forwarding, configuring, reconfiguring, allocating (mapping), assigning, and the like, but function are by no means limited to these. For example, functional block (components) to implement a function of transmission may be referred to as a "transmitting section (transmitting unit)," a "transmitter," and the like. The method for implementing each component is not particularly limited as described above.

Figure 10:
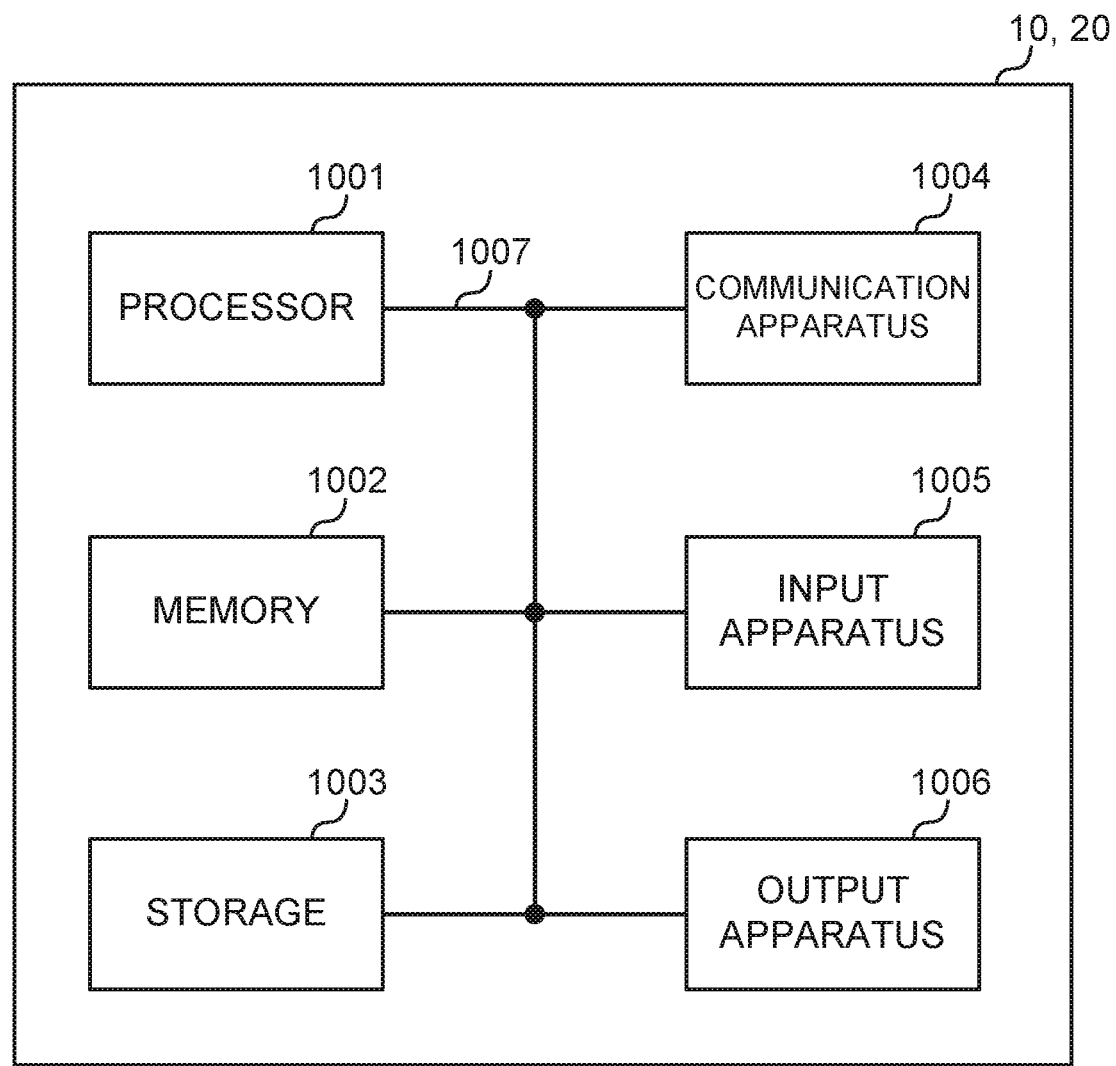
FIG. 10 is a diagram to show an example of a hardware structure of the base station and the user terminal according to one embodiment.

For example, a base station, a user terminal, and so on according to one embodiment of the present disclosure may function as a computer that executes the processes of the radio communication method of the present disclosure. FIG. 10 is a diagram to show an example of a hardware structure of the base station and the user terminal according to one embodiment. Physically, the above-described base station 10 and user terminal 20 may each be formed as computer an apparatus that includes a processor 1001, a memory 1002, a storage 1003, a communication apparatus 1004, an input apparatus 1005, an output apparatus 1006, a bus 1007, and so on.

Note that in the present disclosure, the words such as an apparatus, a circuit, a device, a section, a unit, and so on can be interchangeably interpreted. The hardware structure of the base station 10 and the user terminal 20 may be configured to include one or more of apparatuses shown in the drawings, or may be configured not to include part of apparatuses.

For example, although only one processor 1001 is shown, a plurality of processors may be provided. Furthermore, processes may be implemented with one processor or may be implemented at the same time, in sequence, or in different manners with two or more processors. Note that the processor 1001 may be implemented with one or more chips.

Each function of the base station 10 and the user terminals 20 is implemented, for example, by allowing certain software (programs) to be read on hardware such as the processor 1001 and the memory 1002, and by allowing the processor 1001 to perform calculations to control communication via the communication apparatus 1004 and control at least one of reading and writing of data in the memory 1002 and the storage 1003.

The processor 1001 controls the whole computer by, for example, running an operating system. The processor 1001 may be configured with a central processing unit (CPU), which includes interfaces with peripheral apparatus, control apparatus, computing apparatus, a register, and so on. For example, at least part of the above-described control section 110 (210), the transmitting/receiving section 120 (220), and so on may be implemented by the processor 1001.

Furthermore, the processor 1001 reads programs (program codes), software modules, data, and so on from at least one of the storage 1003 and the communication apparatus 1004, into the memory 1002, and executes various processes according to these. As for the programs, programs to allow computers to execute at least part of the operations of the above-described embodiments are used. For example, the control section 110 (210) may be implemented by control programs that are stored in the memory 1002 and that operate on the processor 1001, and other functional blocks may be implemented likewise.

The memory 1002 is a computer-readable recording medium, and may be constituted with, for example, at least one of a Read Only Memory (ROM), an Erasable Programmable ROM (EPROM), an Electrically EPROM (EEPROM), a Random Access Memory (RAM), and other appropriate storage media. The memory 1002 may be referred to as a "register," a "cache," a "main memory (primary storage apparatus)" and so on. The memory 1002 can store executable programs (program codes), software modules, and the like for implementing the radio communication method according to one embodiment of the present disclosure.

The storage 1003 is a computer-readable recording medium, and may be constituted with, for example, at least one of a flexible disk, a floppy (registered trademark) disk, a magneto-optical disk (for example, a compact disc (Compact Disc ROM (CD-ROM) and so on), a digital versatile disc, a Blu-ray (registered trademark) disk), a removable disk, a hard disk drive, a smart card, a flash memory device (for example, a card, a stick, and a key drive), a magnetic stripe, a database, a server, and other appropriate storage media. The storage 1003 may be referred to as "secondary storage apparatus."

The communication apparatus 1004 is hardware (transmitting/receiving device) for allowing inter-computer communication via at least one of wired and wireless networks, and may be referred to as, for example, a "network device," a "network controller," a "network card," a "communication module," and so on. The communication apparatus 1004 may be configured to include a high frequency switch, a duplexer, a filter, a frequency synthesizer, and so on in order to realize, for example, at least one of frequency division duplex (FDD) and time division duplex (TDD). For example, the above-described transmitting/receiving section 120 (220), the transmitting/receiving antennas 130 (230), and so on may be implemented by the communication apparatus 1004. In the transmitting/receiving section 120 (220), the transmitting section 120a (220a) and the receiving section 120b (220b) can be implemented while being separated physically or logically.

The input apparatus 1005 is an input device that receives input from the outside (for example, a keyboard, a mouse, a microphone, a switch, a button, a sensor, and so on). The output apparatus 1006 is an output device that allows sending output to the outside (for example, a display, a speaker, a Light Emitting Diode (LED) lamp, and so on). Note that the input apparatus 1005 and the output apparatus 1006 may be provided in an integrated structure (for example, a touch panel).

Furthermore, these types of apparatus, including the processor 1001, the memory 1002, and others, are connected by a bus 1007 for communicating information. The bus 1007 may be formed with a single bus, or may be formed with buses that vary between pieces of apparatus.

Also, the base station 10 and the user terminals 20 may be structured to include hardware such as a microprocessor, a digital signal processor (DSP), an Application Specific Integrated Circuit (ASIC), a Programmable Logic Device (PLD), a Field Programmable Gate Array (FPGA), and so on, and part or all of the functional blocks may be implemented by the hardware. For example, the processor 1001 may be implemented with at least one of these pieces of hardware.

Variations

Note that the terminology described in the present disclosure and the terminology that is needed to understand the present disclosure may be replaced by other terms that convey the same or similar meanings. For example, a "channel," a "symbol," and a "signal" (or signaling) may be interchangeably interpreted. Also, "signals" may be "messages." A reference signal may be abbreviated as an "RS," and may be referred to as a "pilot," a "pilot signal," and so on, depending on which standard applies. Furthermore, a "component carrier (CC)" may be referred to as a "cell," a "frequency carrier," a "carrier frequency" and so on.

A radio frame may be constituted of one or a plurality of periods (frames) in the time domain. Each of one or a plurality of periods (frames) constituting a radio frame may be referred to as a "subframe." Furthermore, a subframe may be constituted of one or a plurality of slots in the time domain. A subframe may be a fixed time length (for example, 1 ms) independent of numerology.

Here, numerology may be a communication parameter applied to at least one of transmission and reception of a certain signal or channel. For example, numerology may indicate at least one of a subcarrier spacing (SCS), a bandwidth, a symbol length, a cyclic prefix length, a transmission time interval (TTI), the number of symbols per TTI, a radio frame structure, a particular filter processing performed by a transceiver in the frequency domain, a particular windowing processing performed by a transceiver in the time domain, and so on.

A slot may be constituted of one or a plurality of symbols in the time domain (Orthogonal Frequency Division Multiplexing (OFDM) symbols, Single Carrier Frequency Division Multiple Access (SC-FDMA) symbols, and so on). Furthermore, a slot may be a time unit based on numerology.

A slot may include a plurality of mini-slots. Each mini-slot may be constituted of one or a plurality of symbols in the time domain. A mini-slot may be referred to as a "sub-slot." A mini-slot may be constituted of symbols less than the number of slots. A PDSCH (or PUSCH) transmitted in a time unit larger than a mini-slot may be referred to as "PDSCH (PUSCH) mapping type A." A PDSCH (or PUSCH) transmitted using a mini-slot may be referred to as "PDSCH (PUSCH) mapping type B."

A radio frame, a subframe, a slot, a mini-slot, and a symbol all express time units in signal communication. A radio frame, a subframe, a slot, a mini-slot, and a symbol may each be called by other applicable terms. Note that time units such as a frame, a subframe, a slot, mini-slot, and a symbol in the present disclosure may be interchangeably interpreted.

For example, one subframe may be referred to as a "TTI," a plurality of consecutive subframes may be referred to as a "TTI," or one slot or one mini-slot may be referred to as a "TTI." That is, at least one of a subframe and a TTI may be a subframe (1 ms) in existing LTE, may be a shorter period than 1 ms (for example, 1 to 13 symbols), or may be a longer period than 1 ms. Note that a unit expressing TTI may be referred to as a "slot," a "mini-slot," and so on instead of a "subframe."

Here, a TTI refers to the minimum time unit of scheduling in radio communication, for example. For example, in LTE systems, a base station schedules the allocation of radio resources (such as a frequency bandwidth and transmit power that are available for each user terminal) for the user terminal in TTI units. Note that the definition of TTIs is not limited to this.

TTIs may be transmission time units for channel-encoded data packets (transport blocks), code blocks, or codewords, or may be the unit of processing in scheduling, link adaptation, and so on. Note that, when TTIs are given, the time interval (for example, the number of symbols) to which transport blocks, code blocks, codewords, or the like are actually mapped may be shorter than the TTIs.

Note that, in the case where one slot or one mini-slot is referred to as a TTI, one or more TTIs (that is, one or more slots or one or more mini-slots) may be the minimum time unit of scheduling. Furthermore, the number of slots (the number of mini-slots) constituting the minimum time unit of the scheduling may be controlled.

A TTI having a time length of 1 ms may be referred to as a "normal TTI" (TTI in 3GPP Rel. 8 to Rel. 12), a "long TTI," a "normal subframe," a "long subframe," a "slot" and so on. A TTI that is shorter than a normal TTI may be referred to as a "shortened TTI," a "short TTI," a "partial or fractional TTI," a "shortened subframe," a "short subframe," a "mini-slot," a "sub-slot," a "slot" and so on.

Note that a long TTI (for example, a normal TTI, a subframe, and so on) may be interpreted as a TTI having a time length exceeding 1 ms, and a short TTI (for example, a shortened TTI and so on) may be interpreted as a TTI having a TTI length shorter than the TTI length of a long TTI and equal to or longer than 1 ms.

A resource block (RB) is the unit of resource allocation in the time domain and the frequency domain, and may include one or a plurality of consecutive subcarriers in the frequency domain. The number of subcarriers included in an RB may be the same regardless of numerology, and, for example, may be 12. The number of subcarriers included in an RB may be determined based on numerology.

Also, an RB may include one or a plurality of symbols in the time domain, and may be one slot, one mini-slot, one subframe, or one TTI in length. One TTI, one subframe, and so on each may be constituted of one or a plurality of resource blocks.

Note that one or a plurality of RBs may be referred to as a "physical resource block (Physical RB (PRB))," a "sub-carrier group (SCG)," a "resource element group (REG)," a "PRB pair," an "RB pair" and so on.

Furthermore, a resource block may be constituted of one or a plurality of resource elements (REs). For example, one RE may correspond to a radio resource field of one subcarrier and one symbol.

A bandwidth part (BWP) (which may be referred to as a "fractional bandwidth," and so on) may represent a subset of contiguous common resource blocks (common RBs) for certain numerology in a certain carrier. Here, a common RB may be specified by an index of the RB based on the common reference point of the carrier. A PRB may be defined by a certain BWP and may be numbered in the BWP.

The BWP may include a UL BWP (BWP for the UL) and a DL BWP (BWP for the DL). One or a plurality of BWPs may be configured in one carrier for a UE.

At least one of configured BWPs may be active, and a UE does not need to assume to transmit/receive a certain signal/channel outside active BWPs. Note that a "cell," a "carrier," and so on in the present disclosure may be interpreted as a "BWP".

Note that the above-described structures of radio frames, subframes, slots, mini-slots, symbols, and so on are merely examples. For example, structures such as the number of subframes included in a radio frame, the number of slots per subframe or radio frame, the number of mini-slots included in a slot, the numbers of symbols and RBs included in a slot or a mini-slot, the number of subcarriers included in an RB, the number of symbols in a TTI, the symbol length, the cyclic prefix (CP) length, and so on can be variously changed.

Also, the information, parameters, and so on described in the present disclosure may be represented in absolute values or in relative values with respect to certain values, or may be represented in another corresponding information. For example, radio resources may be specified by certain indices.

The names used for parameters and so on in the present disclosure are in no respect limiting. Furthermore, mathematical expressions that use these parameters, and so on may be different from those expressly disclosed in the present disclosure. For example, since various channels (PUCCH, PDCCH, and so on) and information elements can be identified by any suitable names, the various names allocated to these various channels and information elements are in no respect limiting.

The information, signals, and so on described in the present disclosure may be represented by using any of a variety of different technologies. For example, data, instructions, commands, information, signals, bits, symbols, chips, and so on, all of which may be referenced throughout the herein-contained description, may be represented by voltages, currents, electromagnetic waves, magnetic fields or particles, optical fields or photons, or any combination of these.

Also, information, signals, and so on can be output in at least one of from higher layers to lower layers and from lower layers to higher layers. Information, signals, and so on may be input and/or output via a plurality of network nodes.

The information, signals, and so on that are input and/or output may be stored in a specific location (for example, a memory) or may be managed by using a management table. The information, signals, and so on to be input and/or output can be overwritten, updated, or appended. The information, signals, and so on that are output may be deleted. The information, signals, and so on that are input may be transmitted to another apparatus.

Reporting of information is by no means limited to the aspects/embodiments described in the present disclosure, and other methods may be used as well. For example, reporting of information in the present disclosure may be implemented by using physical layer signaling (for example, downlink control information (DCI), uplink control information (UCI), higher layer signaling (for example, Radio Resource Control (RRC) signaling, broadcast information (master information block (MIB), system information blocks (SIBs), and so on), Medium Access Control (MAC) signaling and so on), and other signals or combinations of these.

Note that physical layer signaling may be referred to as "Layer 1/Layer 2 (L1/L2) control information (L1/L2 control signals)," "L1 control information (L1 control signal)," and so on. Also, RRC signaling may be referred to as an "RRC message," and can be, for example, an RRC connection setup message, an RRC connection reconfiguration message, and so on. Also, MAC signaling may be reported using, for example, MAC control elements (MAC CEs).

Also, reporting of certain information (for example, reporting of "X holds") does not necessarily have to be reported explicitly, and can be reported implicitly (by, for example, not reporting this certain information or reporting another piece of information).

Determinations may be made in values represented by one bit (0 or 1), may be made in Boolean values that represent true or false, or may be made by comparing numerical values (for example, comparison against a certain value).

Software, whether referred to as "software," "firmware," "middleware," "microcode," or "hardware description language," or called by other terms, should be interpreted broadly to mean instructions, instruction sets, code, code segments, program codes, programs, subprograms, software modules, applications, software applications, software packages, routines, subroutines, objects, executable files, execution threads, procedures, functions, and so on.

Also, software, commands, information, and so on may be transmitted and received via communication media. For example, when software is transmitted from a website, a server, or other remote sources by using at least one of wired technologies (coaxial cables, optical fiber cables, twisted-pair cables, digital subscriber lines (DSL), and so on) and wireless technologies (infrared radiation, microwaves, and so on), at least one of these wired technologies and wireless technologies are also included in the definition of communication media.

The terms "system" and "network" used in the present disclosure can be used interchangeably. The "network" may mean an apparatus (for example, a base station) included in the network.

In the present disclosure, the terms such as "precoding," a "precoder," a "weight (precoding weight)," "quasi-co-location (QCL)," a "Transmission Configuration Indication state (TCI state)," a "spatial relation," a "spatial domain filter," a "transmit power," "phase rotation," an "antenna port," an "antenna port group," a "layer," "the number of layers," a "rank," a "resource," a "resource set," a "resource group," a "beam," a "beam width," a "beam angular degree," an "antenna," an "antenna element," a "panel," and so on can be used interchangeably.

In the present disclosure, the terms such as a "base station (BS)," a "radio base station," a "fixed station," a "NodeB," an "eNB (eNodeB)," a "gNB (gNodeB)," an "access point," a "transmission point (TP)," a "reception point (RP)," a "transmission/reception point (TRP)," a "panel," a "cell," a "sector," a "cell group," a "carrier," a "component carrier," and so on can be used interchangeably. The base station may be referred to as the terms such as a "macro cell," a small cell," a "femto cell," a "pico cell," and so on.

A base station can accommodate one or a plurality of (for example, three) cells. When a base station accommodates a plurality of cells, the entire coverage area of the base station can be partitioned into multiple smaller areas, and each smaller area can provide communication services through base station subsystems (for example, indoor small base stations (Remote Radio Heads (RRHs))). The term "cell" or "sector" refers to part of or the entire coverage area of at least one of a base station and a base station subsystem that provides communication services within this coverage.

In the present disclosure, the terms "mobile station (MS)," "user terminal," "user equipment (UE)," and "terminal" may be used interchangeably.

A mobile station may be referred to as a "subscriber station," "mobile unit," "subscriber unit," "wireless unit," "remote unit," "mobile device," "wireless device," "wireless communication device," "remote device," "mobile subscriber station," "access terminal," "mobile terminal," "wireless terminal," "remote terminal," "handset," "user agent," "mobile client," "client," or some other appropriate terms in some cases.

At least one of a base station and a mobile station may be referred to as a "transmitting apparatus," a "receiving apparatus," a "radio communication apparatus," and so on. Note that at least one of a base station and a mobile station may be device mounted on a moving object or a moving object itself, and so on. The moving object may be a vehicle (for example, a car, an airplane, and the like), may be a moving object which moves unmanned (for example, a drone, an automatic operation car, and the like), or may be a robot (a manned type or unmanned type). Note that at least one of a base station and a mobile station also includes an apparatus which does not necessarily move during communication operation. For example, at least one of a base station and a mobile station may be an Internet of Things (IoT) device such as a sensor, and the like.

Furthermore, the base station in the present disclosure may be interpreted as a user terminal. For example, each aspect/embodiment of the present disclosure may be applied to the structure that replaces a communication between a base station and a user terminal with a communication between a plurality of user terminals (for example, which may be referred to as "Device-to-Device (D2D)," "Vehicle-to-Everything (V2X)," and the like). In this case, user terminals 20 may have the functions of the base stations 10 described above. The words "uplink" and "downlink" may be interpreted as the words corresponding to the terminal-to-terminal communication (for example, "side"). For example, an uplink channel, a downlink channel and so on may be interpreted as a side channel.

Likewise, the user terminal in the present disclosure may be interpreted as base station. In this case, the base station 10 may have the functions of the user terminal 20 described above.

Actions which have been described in the present disclosure to be performed by a base station may, in some cases, be performed by upper nodes. In a network including one or a plurality of network nodes with base stations, it is clear that various operations that are performed to communicate with terminals can be performed by base stations, one or more network nodes (for example, Mobility Management Entities (MMEs), Serving-Gateways (S-GWs), and so on may be possible, but these are not limiting) other than base stations, or combinations of these.

The aspects/embodiments illustrated in the present disclosure may be used individually or in combinations, which may be switched depending on the mode of implementation. The order of processes, sequences, flowcharts, and so on that have been used to describe the aspects/embodiments in the present disclosure may be re-ordered as long as inconsistencies do not arise. For example, although various methods have been illustrated in the present disclosure with various components of steps in exemplary orders, the specific orders that are illustrated herein are by no means limiting.

The aspects/embodiments illustrated in the present disclosure may be applied to Long Term Evolution (LTE), LTE-Advanced (LTE-A), LTE-Beyond (LTE-B), SUPER 3G, IMT-Advanced, 4th generation mobile communication system (4G), 5th generation mobile communication system (5G), Future Radio Access (FRA), New-Radio Access Technology (RAT), New Radio (NR), New radio access (NX), Future generation radio access (FX), Global System for Mobile communications (GSM (registered trademark)), CDMA 2000, Ultra Mobile Broadband (UMB), IEEE 802.11 (Wi-Fi (registered trademark)), IEEE 802.16 (WiMAX (registered trademark)), IEEE 802.20, Ultra-WideBand (UWB), Bluetooth (registered trademark), systems that use other adequate radio communication methods and next-generation systems that are enhanced based on these. A plurality of systems may be combined (for example, a combination of LTE or LTE-A and 5G, and the like) and applied.

The phrase "based on" (or "on the basis of") as used in the present disclosure does not mean "based only on" (or "only on the basis of"), unless otherwise specified. In other words, the phrase "based on" (or "on the basis of") means both "based only on" and "based at least on" ("only on the basis of" and "at least on the basis of").

Reference to elements with designations such as "first," "second," and so on as used in the present disclosure does not generally limit the quantity or order of these elements. These designations may be used in the present disclosure only for convenience, as a method for distinguishing between two or more elements. Thus, reference to the first and second elements does not imply that only two elements may be employed, or that the first element must precede the second element in some way.

The term "judging (determining)" as in the present disclosure herein may encompass a wide variety of actions. For example, "judging (determining)" may be interpreted to mean making "judgments (determinations)" about judging, calculating, computing, processing, deriving, investigating, looking up, search and inquiry (for example, searching a table, a database, or some other data structures), ascertaining, and so on.

Furthermore, "judging (determining)" may be interpreted to mean making "judgments (determinations)" about receiving (for example, receiving information), transmitting (for example, transmitting information), input, output, accessing (for example, accessing data in a memory), and so on.

In addition, "judging (determining)" as used herein may be interpreted to mean making "judgments (determinations)" about resolving, selecting, choosing, establishing, comparing, and so on. In other words, "judging (determining)" may be interpreted to mean making "judgments (determinations)" about some action.

In addition, "judging (determining)" may be interpreted as "assuming," "expecting," "considering," and the like.

"The maximum transmit power" according to the present disclosure may mean a maximum value of the transmit power, may mean the nominal maximum transmit power (the nominal UE maximum transmit power), or may mean the rated maximum transmit power (the rated UE maximum transmit power).

The terms "connected" and "coupled," or any variation of these terms as used in the present disclosure mean all direct or indirect connections or coupling between two or more elements, and may include the presence of one or more intermediate elements between two elements that are "connected" or "coupled" to each other. The coupling or connection between the elements may be physical, logical, or a combination thereof. For example, "connection" may be interpreted as "access."

In the present disclosure, when two elements are connected, the two elements may be considered "connected" or "coupled" to each other by using one or more electrical wires, cables and printed electrical connections, and, as some non-limiting and non-inclusive examples, by using electromagnetic energy having wavelengths in radio frequency regions, microwave regions, (both visible and invisible) optical regions, or the like.

In the present disclosure, the phrase "A and B are different" may mean that "A and B are different from each other." Note that the phrase may mean that "A and B is each different from C." The terms "separate," "be coupled," and so on may be interpreted similarly to "different."

When terms such as "include," "including," and variations of these are used in the present disclosure, these terms are intended to be inclusive, in a manner similar to the way the term "comprising" is used. Furthermore, the term "or" as used in the present disclosure is intended to be not an exclusive disjunction.

For example, in the present disclosure, when an article such as "a," "an," and "the" in the English language is added by translation, the present disclosure may include that a noun after these articles is in a plural form.

Now, although the invention according to the present disclosure has been described in detail above, it should be obvious to a person skilled in the art that the invention according to the present disclosure is by no means limited to the embodiments described in the present disclosure. The invention according to the present disclosure can be implemented with various corrections and in various modifications, without departing from the spirit and scope of the invention defined by the recitations of claims. Consequently, the description of the present disclosure is provided only for the purpose of explaining examples, and should by no means be construed to limit the invention according to the present disclosure in any way.

What is claimed is:

1. A terminal comprising:
a receiver that receives downlink control information for releasing a plurality of semi-persistent schedulings (SPSs); and
a processor that performs a control to include, in a semi-static HARQ-ACK codebook, hybrid automatic repeat request acknowledgement (HARQ-ACK) corresponding to the downlink control information in at least one of a plurality of positions of HARQ-ACK corresponding to physical downlink shared channel (PDSCH) reception of the plurality of SPSs,
wherein the processor determines that one of the plurality of positions in which the HARQ-ACK corresponding to the downlink control information is included is a position of HARQ-ACK for PDSCH reception corresponding to an SPS configuration, the SPS configuration having an SPS configuration index or period of a given value out of the plurality of SPSs.

2. The terminal according to claim 1, wherein the processor determines that one of the plurality of positions including HARQ-ACK corresponding to the downlink control information is a position of HARQ-ACK for PDSCH reception corresponding to an SPS configuration with a minimum SPS configuration index out of the plurality of SPSs.

3. A radio communication method for a terminal, comprising:
receiving downlink control information for releasing a plurality of semi-persistent schedulings (SPSs); and
performing a control to include, in a semi-static HARQ-ACK codebook, hybrid automatic repeat request acknowledgement (HARQ-ACK) corresponding to the downlink control information in at least one of a plurality of positions of HARQ-ACK corresponding to physical downlink shared channel (PDSCH) reception of the plurality of SPSs,
wherein one of the plurality of positions in which the HARQ-ACK corresponding to the downlink control information is included is a position of HARQ-ACK for PDSCH reception corresponding to an SPS configuration, the SPS configuration having an SPS configuration index or period of a given value out of the plurality of SPSs.

4. A base station comprising:
a transmitter that transmits downlink control information for releasing a plurality of semi-persistent schedulings (SPSs); and
a processor that assumes that hybrid automatic repeat request acknowledgement (HARQ-ACK) corresponding to the downlink control information is included, in a semi-static HARQ-ACK codebook, in at least one of a plurality of positions of HARQ-ACK corresponding to physical downlink shared channel (PDSCH) transmission of the plurality of SPSs,
wherein the processor assumes that one of the plurality of positions in which HARQ-ACK corresponding to the downlink control information is included is a position of HARQ-ACK for PDSCH transmission corresponding to an SPS configuration, the SPS configuration having an SPS configuration index or period of a given value out of the plurality of SPSs.

5. A system comprising a terminal and a base station, wherein
the terminal comprises:
a receiver that receives downlink control information for releasing a plurality of semi-persistent schedulings (SPSs); and
a processor that performs a control to include, in a semi-static HARQ-ACK codebook, hybrid automatic repeat request acknowledgement (HARQ-ACK) corresponding to the downlink control information in at least one of a plurality of positions of HARQ-ACK corresponding to physical downlink shared channel (PDSCH) reception of the plurality of SPSs, and
the base station comprises:
a transmitter that transmits the downlink control information,
wherein the processor determines that one of the plurality of positions in which the HARQ-ACK corresponding to the downlink control information is included is a position of HARQ-ACK for PDSCH reception corresponding to an SPS configuration, the SPS configuration having an SPS configuration index or period of a given value out of the plurality of SPSs.

* * * * *